United States Patent [19]
Saunders et al.

[11] Patent Number: 6,167,085
[45] Date of Patent: Dec. 26, 2000

[54] IMAGE DATA COMPRESSION

[75] Inventors: Nicholas Ian Saunders; Clive Henry Gillard, both of Basingstoke, United Kingdom

[73] Assignees: Sony Corporation, Tokyo, Japan; Sony United Kingdom Limited, Weybridge, United Kingdom

[21] Appl. No.: 08/903,780
[22] Filed: Jul. 31, 1997
[51] Int. Cl.[7] ................................................. H04B 1/66
[52] U.S. Cl. ...................................................... 375/240.03
[58] Field of Search ........................... 348/394.1, 400.1, 348/403.1, 404.1, 405.1, 407.1, 409.1, 413.1; 386/33, 36, 37, 111, 112, 119, 122, 123; 375/240, 240.01, 240.03, 240.16; 382/239; H04N 7/12; H04B 1/66

[56] References Cited

U.S. PATENT DOCUMENTS

| | | | |
|---|---|---|---|
| 4,475,213 | 10/1984 | Medaugh ................................ | 375/27 |
| 5,122,875 | 6/1992 | Raychaudhuri et al. ............... | 358/133 |
| 5,134,475 | 7/1992 | Johnston et al. ...................... | 358/133 |
| 5,146,324 | 9/1992 | Miller et al. .......................... | 358/133 |
| 5,164,963 | 11/1992 | Lawrence et al. ..................... | 375/39 |
| 5,307,163 | 4/1994 | Hatano et al. ......................... | 348/415 |
| 5,321,440 | 6/1994 | Yanagihara et al. ................... | 348/408 |
| 5,384,670 | 1/1995 | Gillard et al. ......................... | 360/48 |
| 5,444,542 | 8/1995 | Hoshi et al. ........................... | 348/408 |
| 5,446,597 | 8/1995 | Matsumi et al. ...................... | 360/19.1 |
| 5,596,421 | 1/1997 | Shibata et al. ........................ | 386/126 |
| 5,642,242 | 6/1997 | Ozaki et al. ........................... | 360/48 |
| 5,838,925 | 11/1998 | Kotani ................................... | 395/200 |
| 5,937,098 | 8/1999 | Abe ....................................... | 382/239 |
| 5,956,429 | 9/1999 | Burns .................................... | 382/245 |
| 5,987,183 | 11/1999 | Saunders et al. ...................... | 382/239 |
| 5,995,149 | 11/1999 | Saunders et al. ...................... | 348/408 |

*Primary Examiner*—Chris S. Kelley
*Assistant Examiner*—Tung Vo
*Attorney, Agent, or Firm*—Frommer Lawrence & Haug, LLP; William S. Frommer; Dexter T. Chang

[57] ABSTRACT

Image data compression apparatus in which data is encoded using a variable degree of quantization selected for areas of an image so that the quantity of encoded data for each area does not exceed a predetermined maximum quantity of data comprises two or more trial encoders operable in parallel to trial encode image data using respective predetermined trial degrees of quantization; a selector for selecting one of the predetermined trial degrees of quantization in response to the quantities of data produced during the trial quantizations; and one or more further trial encoders operable to trial encode image data using degrees of quantization derived from the degree of quantization selected by the selector.

5 Claims, 20 Drawing Sheets

| AM | No OF BITS AVAILABLE FOR EACH AC |
|---|---|
| 00 | 0 |
| 01 | 1 |
| 10 | 2 |
| 11 | 3 |
FIG. 8
| AC | 6 | 4 | 2 | 0 | 1 | 3 | 5 | 7 |
|---|---|---|---|---|---|---|---|---|
| Q_mod | -14 | -10 | -6 | -2 | 2 | 6 | 10 | 14 |
FIG. 9
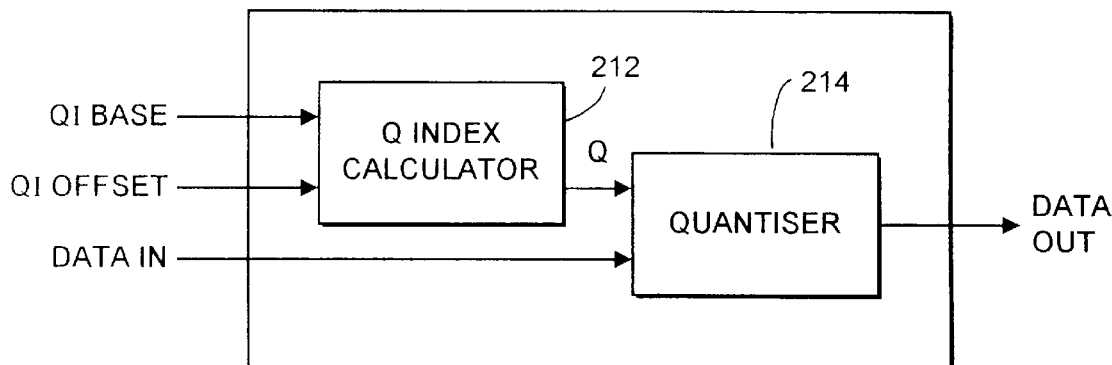
FIG. 10
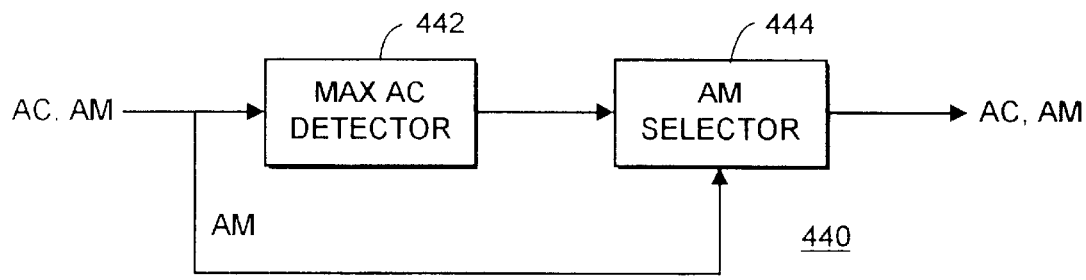
FIG. 11

IMAGE DATA COMPRESSION

BACKGROUND OF THE INVENTION

1. Field of the Invention

This invention relates to apparatus and methods for image data compression.

2. Description of the Prior Art

In an image data compression system, often the output bit rate of a compressed data stream is constrained by the capacity of a transmission or storage channel. A particular example of this is when compressed video data has to be recorded on a tape channel; generally, to maintain real-time operation, a whole field or frame's worth of compressed data has to be recorded onto a predetermined number of record tracks.

In order to comply with this constraint, the bit rate of the output compressed data is controlled by controlling the degree of compression applied. In many cases, this is achieved through controlling a quantization factor applied to the video data (e.g. after transformation to the frequency domain).

The effect of varying the quantization factor on the quantity of compressed data is highly non-linear and not easily predictable. This means that a suitable quantization factor can be chosen accurately only by performing trial compressions.

One previously proposed way of performing trial compressions is the so-called binary search. This is an iterative process whereby a first trial quantization is performed using a quantization factor of, say, one half of the available range. Subsequent stages of trial quantization are performed at values which are either less than or greater than the quantization factor used in the preceding stage, depending on whether the preceding stage produced too much or too little compressed data. The increment or decrement applied between stages decreases with each stage, in order to iterate towards a correct value.

For example, if the available range of quantization values is from 1 to 64, in a binary search technique a first trial quantization might be performed at a quantization value of 32. Depending on whether this produces too much or too little output data, the second stage might use a value of either 48 or 16, i.e. 32±16. A third stage would then use one of 8, 24, 40 or 56, i.e. (48 or 16)±8, and so on. At the final stage, the most appropriate of all of the values tested (i.e. the value generating a data amount nearest to, but under, the available bit rate) is selected for use in compressing that input data.

So, in the above example, six stages of trial compression are needed to select a quantization value in the range from 1 to 64. A perceived advantage of this arrangement is that it avoids the need to perform 64 trial compressions to select a quantization value.

However, one drawback of the binary search technique is that the stages of trial compression must be performed consecutively, because the results of each stage are needed before the quantization value to be used in the next stage can be chosen. This imposes a considerable delay on the data compression system—a problem not only because of the actual time delay applied to the data, but also because substantial amounts of memory are required to store the input data for the delay period. The specific example above requires six delay periods for the binary search process. This can be difficult to implement where the apparatus is embodied, for example, as an application specific integrated circuit (ASIC).

It is an object of the invention to provide an improved technique for selecting quantization values to be used in data compression.

SUMMARY OF THE INVENTION

This invention provides image data compression apparatus in which data is encoded using a variable degree of quantization selected for areas of an image so that the quantity of encoded data for each area does not exceed a predetermined maximum quantity of data, the apparatus comprising: two or more trial encoders operable in parallel to trial encode image data using respective predetermined trial degrees of quantization; a selector for selecting one of the predetermined trial degrees of quantization in response to the quantities of data produced during the trial quantizations; and one or more further trial encoders operable to trial encode image data using degrees of quantization derived from the degree of quantization selected by the selector.

The invention addresses the problems described above by a novel hybrid or two-stage approach to selecting a suitable degree of quantization.

In a first stage of operation, two or more trial quantizations are performed in parallel. These trial quantizations preferably use degrees of quantization which are substantially evenly spaced through the available range of degrees of quantization, so that this first stage narrows down the range of values which needs to be tested by the second stage.

The second stage may preferably be a binary search type of system, but this takes as its staring point a degree of quantization derived from one of the degrees of quantization selected in response to the first stage. So, the second stage has many fewer possible degrees of quantization to test, and can therefore employ fewer trial quantizers and fewer delay circuits.

Referring to the example above, in a system where a quantization value can vary between 1 and 64, a first stage using 10 quantizers would narrow the range of quantization values needing to be binary-searched down to a range of 6, and so only three binary search stages are then required. So, in total, this example arrangement reduces the number of delay periods required for the quantization factor search technique from six (see above) to four.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 8 is a table showing the quantities of data required for different activity modes;

FIG. 9 is a table showing the effect of activity codes on the applied degree of quantization;

FIG. 10 is a schematic diagram of a quantizer;

FIG. 11 schematically illustrates a part of a bit allocator;

DESCRIPTION OF THE PREFERRED EMBODIMENTS

Figure 1:
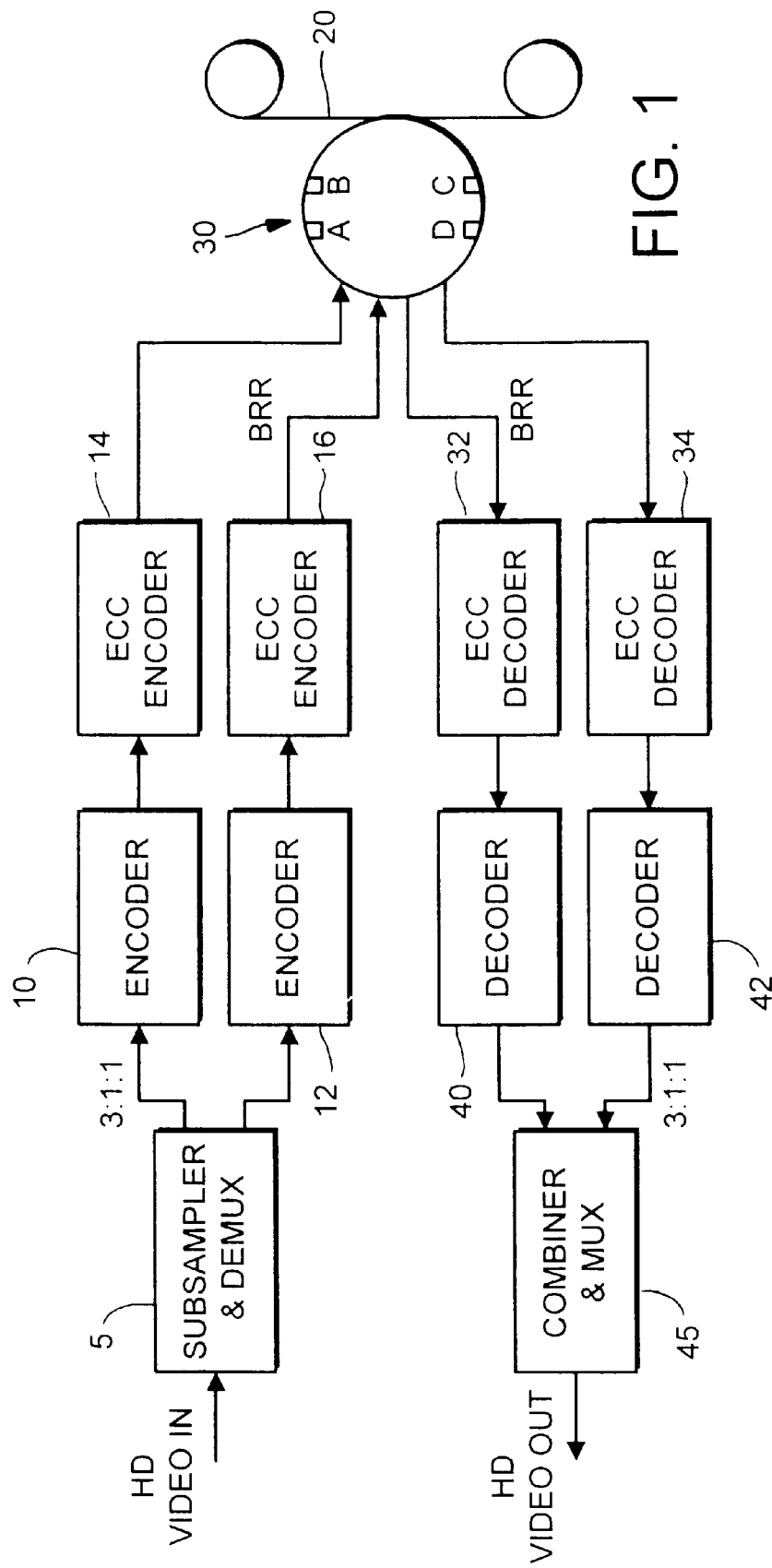
FIG. 1 is a schematic diagram of a bit-rate reducing encoder and a corresponding decoder for use with a magnetic tape channel.

FIG. 1 is a schematic diagram of a tape recording and reproducing system comprising a subsampler and demultiplexer 5, a pair of bit-rate reducing encoders 10, 12, error correction (ECC) encoders 14, 16, a tape channel 20, tape recording and reproducing apparatus (including rotary magnetic heads A . . . D) 30, error correction decoders 32, 34, a pair of corresponding data decoders 40, 42, and a combiner and multiplexer 45.

The subsampler and demultiplexer 5 receives an input 4:2:2 format high definition video signal, subsamples it to a 3:1:1 format and divides the resulting data into two for parallel processing by the encoders 10, 12. The encoders 10, 12 are identical, and each generate a bit-rate reduced (BRR) signal for recording on the tape medium. Similarly, the decoders 40, 42 receive BRR signals reproduced from the tape medium and decode the BRR signals to form respective portions of an output 3:1:1 video signal. The combiner and multiplexer 45 recombines these portions to form the output high definition video signal.

Figure 2:
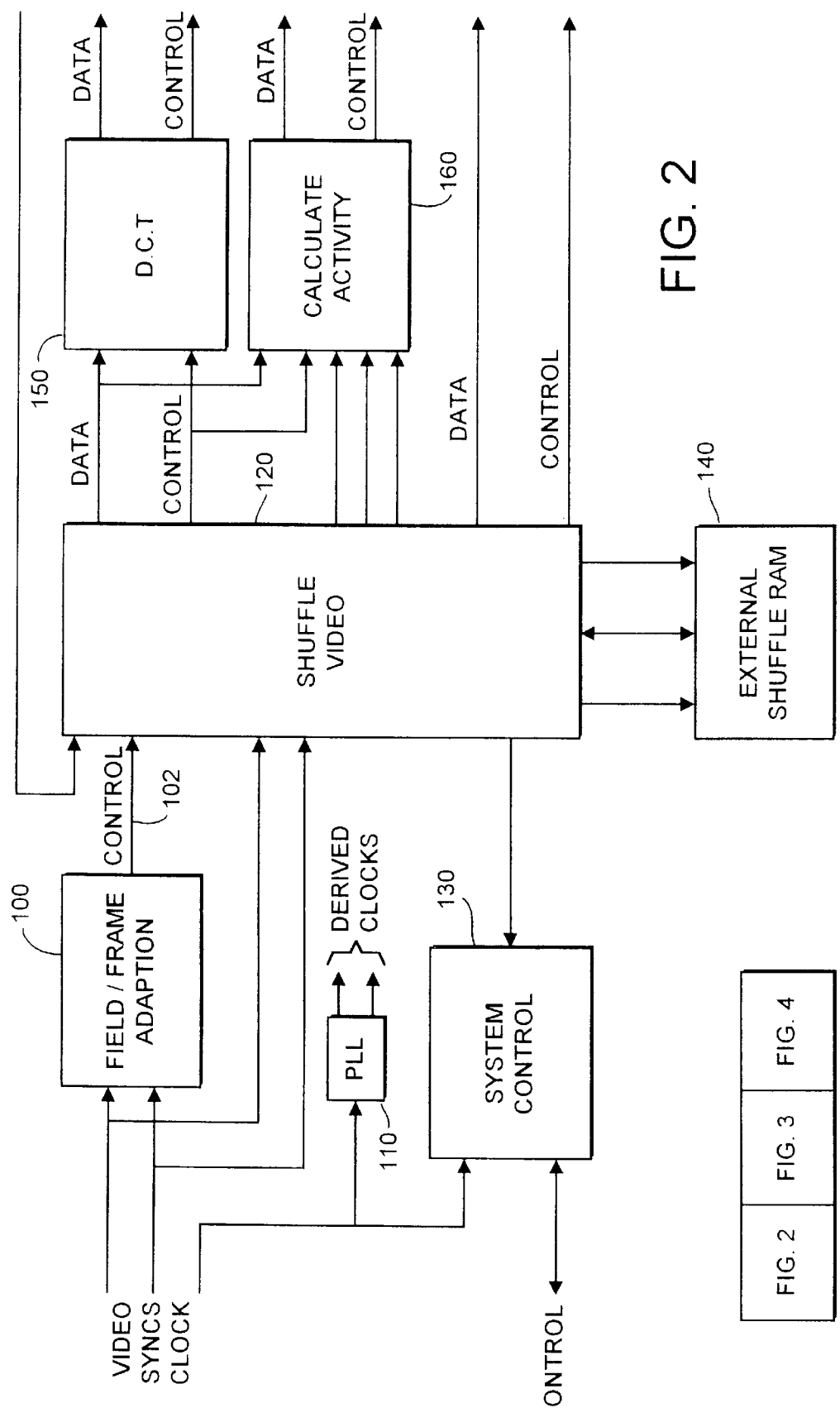
FIGS. 2 to 4 schematically illustrate the bit-rate reducing encoder of FIG. 1.

Referring now to FIG. 2, the input video signal to the encoder, in the so-called 3:1:1 format ($Y_0$ $Y_1$ $Y_2$ $C_b$ $C_r$ etc), a horizontal sync signal and a 46.4 MHz video clock are supplied to a field/frame adaption circuit 100, a phase lock loop 110, a video shuffler 120 and a system controller 130.

The field/frame adaption circuit 100 is used to control switching of the encoder between a frame-based mode of operation and a field-based mode of operation. This switching occurs at a scene change, so that a field-based mode of operation is used for the frame of a scene change.

In order to detect a scene change in the input video signal, the field/frame adaption circuit 100 divides each input field into 16 blocks, each being 300 pixels by 135 lines. The dc level and variance of each block for each field are then calculated as follows:

dc=Σ(pixel value)

variance=Σ(pixel value)$^2$

The variance of the blocks is then normalized as follows:

normalized variance=Σ(pixel value)$^2$/Σ(pixel value)

The dc level and variance for each block of the two fields comprising a single frame are then compared (on a block-by-corresponding-block basis) to detect whether the two fields are considered to be similar. The following relationships are used to make this detection:

(a) if $dc_{fld1} \times dc_{lower\ threshold} > dc_{fld0}$ and $dc_{fld1} \times dc_{upper\ threshold} < dc_{fld0}$ then $dc_{fld1}$ is considered to be similar to $dc_{fld0}$ (b) if $var_{fld1} \times var_{lower\ threshold} > var_{fld0}$ and $var_{fld1} \times var_{upper\ threshold} < var_{fld0}$ then $var_{fld1}$ is considered to be similar to $var_{fld0}$ The number of dc and variance blocks that are similar between the two fields are then compared to separate thresholds:

if number_similar$_{dc\ blocks}$>dc block threshold and number_similar$_{var\ blocks}$>var block threshold then the two fields are considered to be part of the same video scene.

The result of this detection is supplied on a control output 102 from the field/frame adaption circuit 100.

The PLL 110 receives the 46.4 MHz clock supplied to the encoder and derives other clock signals required by the encoder apparatus from that clock signal.

The system controller 130 controls the apparatus to operate in the manner described.

The video shuffler 120 receives pixels of the input video signal and stores them temporarily in an external shuffle RAM 140. It then reads blocks of pixels from the external shuffle RAM according to a predetermined shuffle pattern so that blocks of pixels which are adjacent in the image are not read out at adjacent positions in the shuffle pattern.

The reason for this measure is to try to alleviate the effect of data losses (e.g. due to a tape drop-out or similar) on the picture reconstructed by the decoder apparatus. Because pixel blocks which are adjacent in the image are separated from one another in the resulting bit stream (because they are shuffled by the video shuffler 120), a short duration data loss might affect a number of pixel blocks but not their immediate neighbours in the image. This allows data concealment to be used to reconstruct the missing blocks.

The current frame is written to the external RAM while the previous frame is read, in a shuffled manner, from the external RAM.

Figure 3:
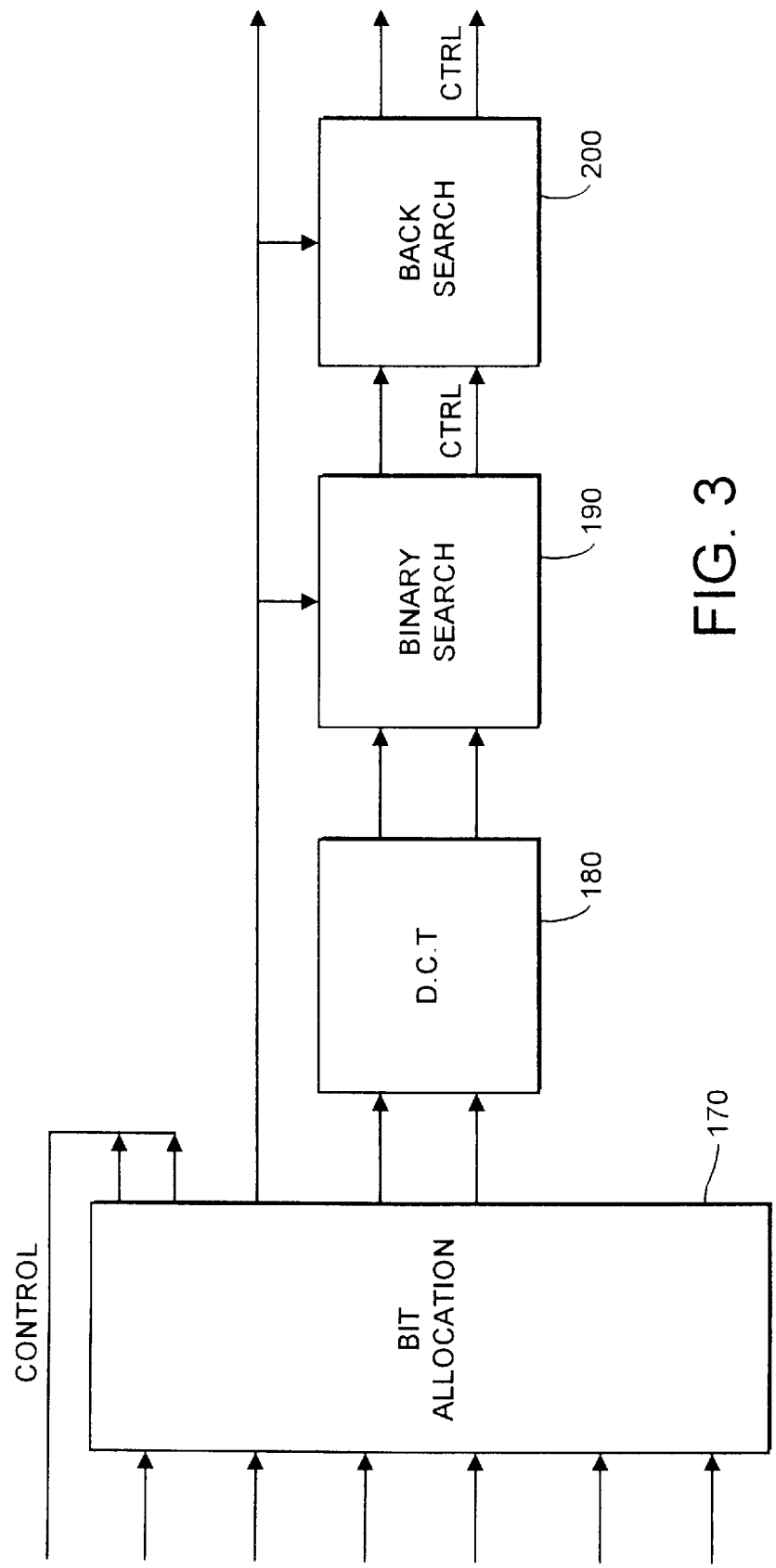

The shuffled data from the video shuffler 120 is supplied to a discrete cosine transform (DCT unit 150), an activity calculator 160 and (referring to FIG. 3) a bit allocator 170.

The DCT unit 150 transform each pixel block supplied from the video shuffler 120 into a corresponding block of DCT coefficients using known techniques. These coefficients are supplied to the bit allocator 170.

The activity calculator 160 generates so-called "activity codes" and corresponding offsets to be applied to the quantization index for each block of data. These codes specify the so-called activity of each block, assessed according to the following principles:

(i) a block containing more detail (measured for example by the variance of the pixel values within the block) has a higher activity than a block having less detail;

(ii) a block predominantly containing colours associated with skin tones is quantized less harshly (i.e. given a lower notional activity) than a block predominantly not containing such colours;

(iii) a block having a very low or a very high average luminance level is quantized more harshly (i.e. given a higher notional activity) than a block having a mid-range average luminance level (Weber's law). For example, if a block's average luminance level is above 224 or below 32 (in an eight bit system) then a constant value is added to the calculation of the block's activity. If the block's average luminance level is between 32 and 224 then the activity calculation is unaltered.

In general, the activity codes are used to control the later operation of the encoder, so that pixel blocks having a higher activity are subjected to harsher compression, since it is less likely that the viewer would spot compression artifacts in that block when the block is subsequently decompressed. Blocks having a low activity, e.g. relatively "smooth" surfaces, relatively dark areas or areas having colours corresponding to skin tones, are compressed less harshly, since the user is more likely to spot compression artifacts in those areas.

The quantization index offsets are embedded in the bitstream, whereas the activity codes (which are needed to specify the quantization offsets to be used on decoding) are supplied separately for possible "optimization"—see below.

The bit allocator 170 receives DCT data from the DCT encoder 150 and activity data from the activity calculator 160. The bit allocator 170 performs a trial quantization of the DCT data, followed by a trial part of an entropy encoding process.

Using these techniques, the bit allocator calculates the number of bits which would be required to encode each DCT block at one of ten quantization "base" values: 7, 13, 19, 25, 31, 37, 43, 49, 55 and 61, subject to each block's quantization index offset calculated by the activity calculator. Ultimately, the quantization level for each block is selected to a resolution of 1 (using the scale given above), but for the purposes of the bit allocator 170, the quantization base value is assessed to the nearest 6 on that scale.

At the output of the bit allocator, therefore, a figure derived from the nearest appropriate quantization base level from the selection given above is passed, together with a delayed version of the video data, to a further DCT unit 180, a binary search unit 190 and a backsearch unit 200. This process will be described further below, but in brief, a value 2 greater than the quantization value giving just over the required bit rate is passed by the bit allocator.

The further DCT unit 180 again calculates DCT coefficients, this time based on the delayed version of the video data.

The binary search unit 190 carries out trial quantizations at quantization levels just above or just below the base quantization level, again modified by the quantization index offsets associated with each block, to select one value within a range of −3 to +4 with respect to the base quantization level from the bit allocator.

A further trial quantization is carried out by the backsearch unit which tests the quantization level selected by the binary search unit 190, and assesses whether a higher quantization level could be used whilst still obtaining the same or fewer quantization errors.

Finally, the selected quantization level, and the DCT blocks from the further DCT encoder 180, are supplied to a quantizer 210 where they are quantized according to the selected quantization level. The quantized data are passed to an entropy encoder 220 which generates variable length output data according to the standard principles of entropy encoding, so that more commonly occurring data patterns in the quantized data are encoded using shorter code words.

The data generated by the entropy encoder is then packed into "code blocks" for recording on tape by a data packer 230. The code blocks include header data, entropy-encoded data from a number of DCT blocks, activity codes associated with those blocks and an indication of the quantization level used in forming the blocks. Error correcting codes are then applied to provide error correction when the code blocks are replayed from the tape. A code block comprises five "sync blocks", where a sync block is the smallest separately recoverable data item recorded on the tape in this system. A sync block is illustrated schematically in FIG. 13 and is described further below.

Figure 5:
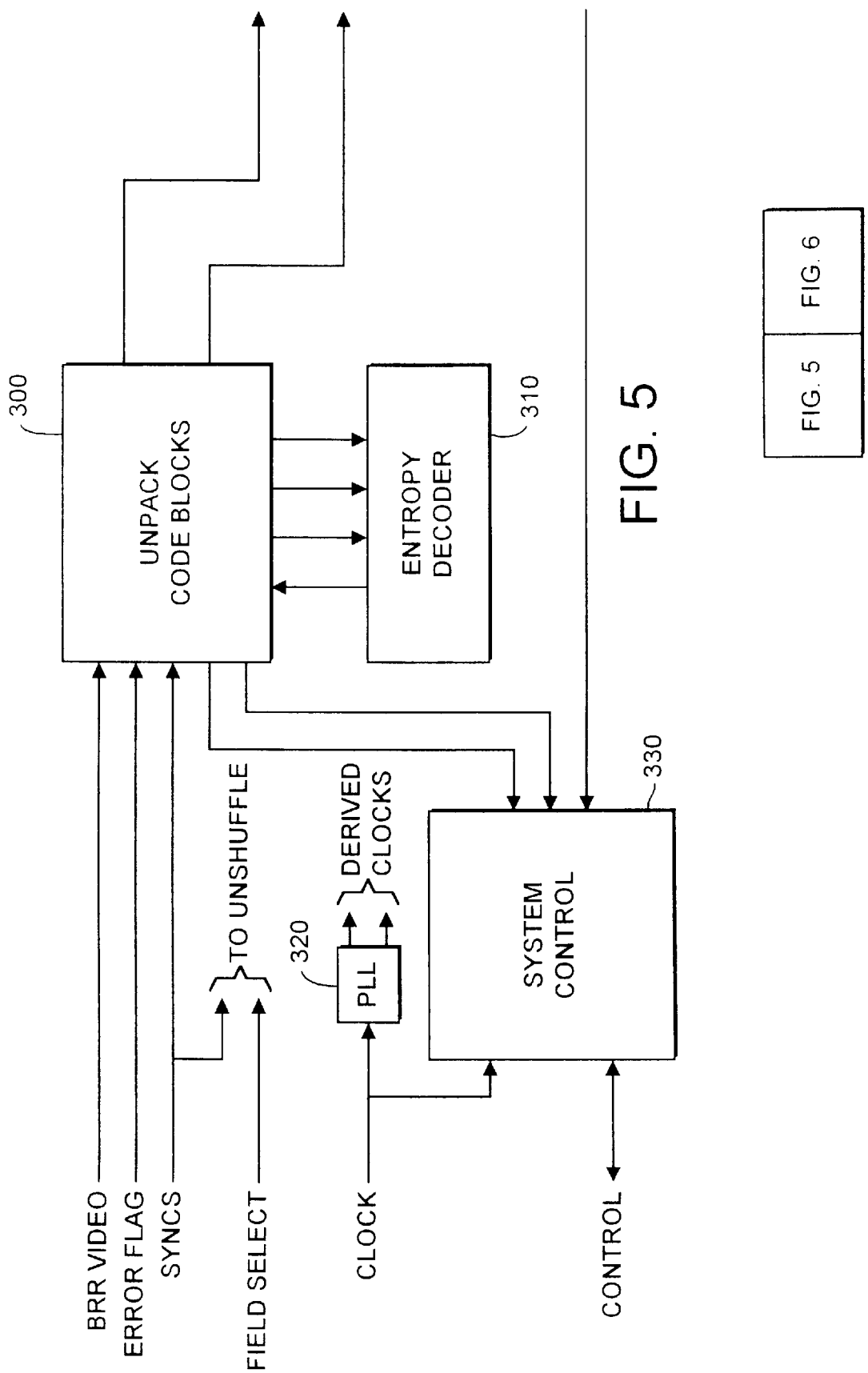
FIGS. 5 and 6 schematically illustrate the corresponding decoder of FIG. 1.
Figure 6:
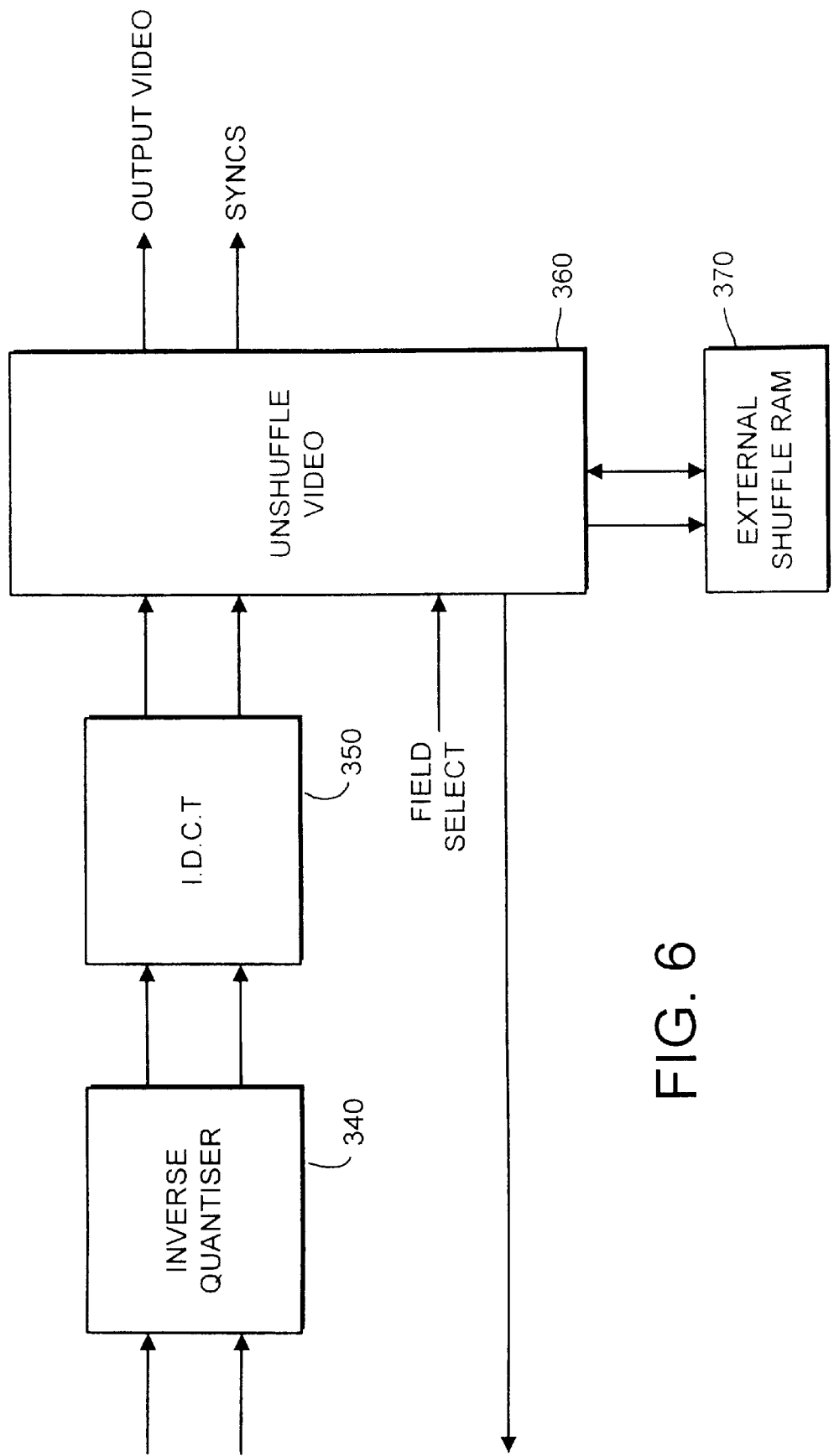

FIGS. 5 and 6 schematically illustrate the structure of the decoder 40 of FIG. 1.

Figure 4:
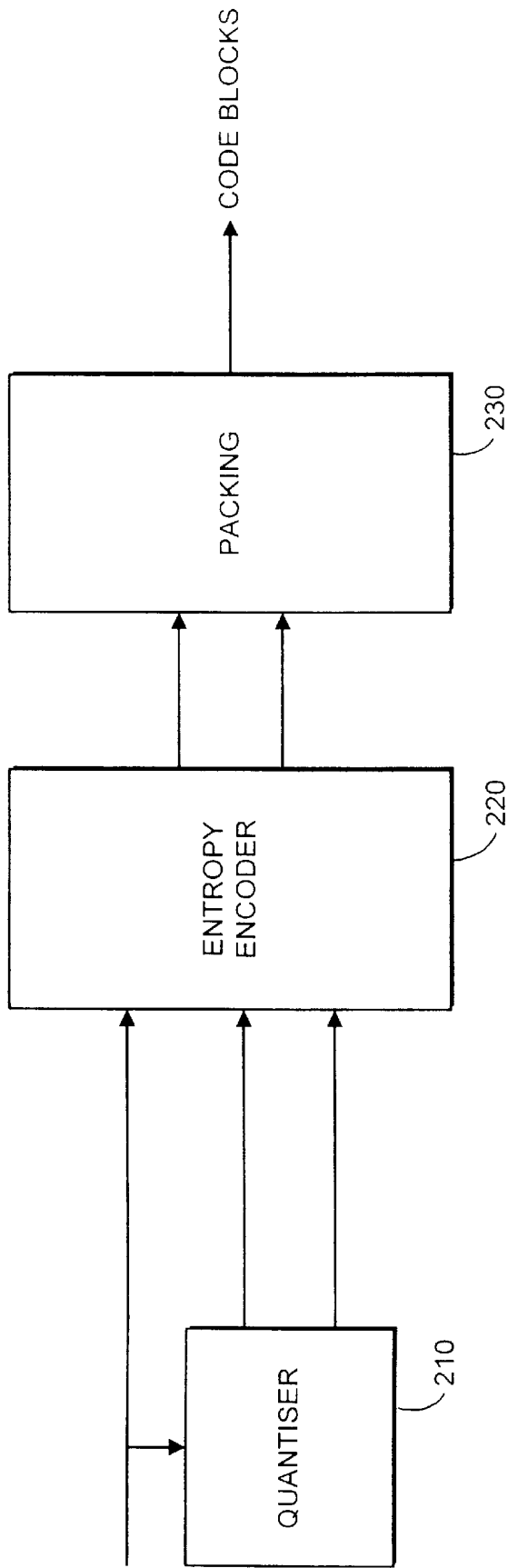

The bit-rate reduced (BRR) video, an error flag indicative of a data error in the BRR signal and horizontal and frame sync pulses are supplied to an unpacker 300. This operates in a complementary manner to the packer 230 of FIG. 4, to unpack individual DCT blocks (as entropy encoded) from the code blocks recovered from the tape. The unpacker forwards the entropy encoded data unpacked from the code blocks to an entropy decoder 310 where the DCT data is recovered.

A phase lock loop 320 receives a clocking signal associated with the input data and derives other clocking signals required by other parts of the decoding apparatus.

A system controller 330 controls the operation of the apparatus as described herein.

Turning now to FIG. 6, the entropy decoded DCT blocks are supplied to an inverse quantizer 340 where an inverse quantizing operation is carried out. The output from the inverse quantizer is supplied to an inverse DCT unit 350 where an inverse DCT operation is performed.

This generates blocks of image data, but in the shuffled order (by virtue of the shuffler 120 on the encoder 10. Therefore, an unshuffler 360 is used to recreate the correct image order of the pixel blocks. This is carried out by writing the pixel data to an external shuffle RAM 370 during one field or frame, and then reading it out in the correct order during the next field or frame. The output of the unshuffler 360 forms the output video signal and an associated sync signal.

Figure 7:
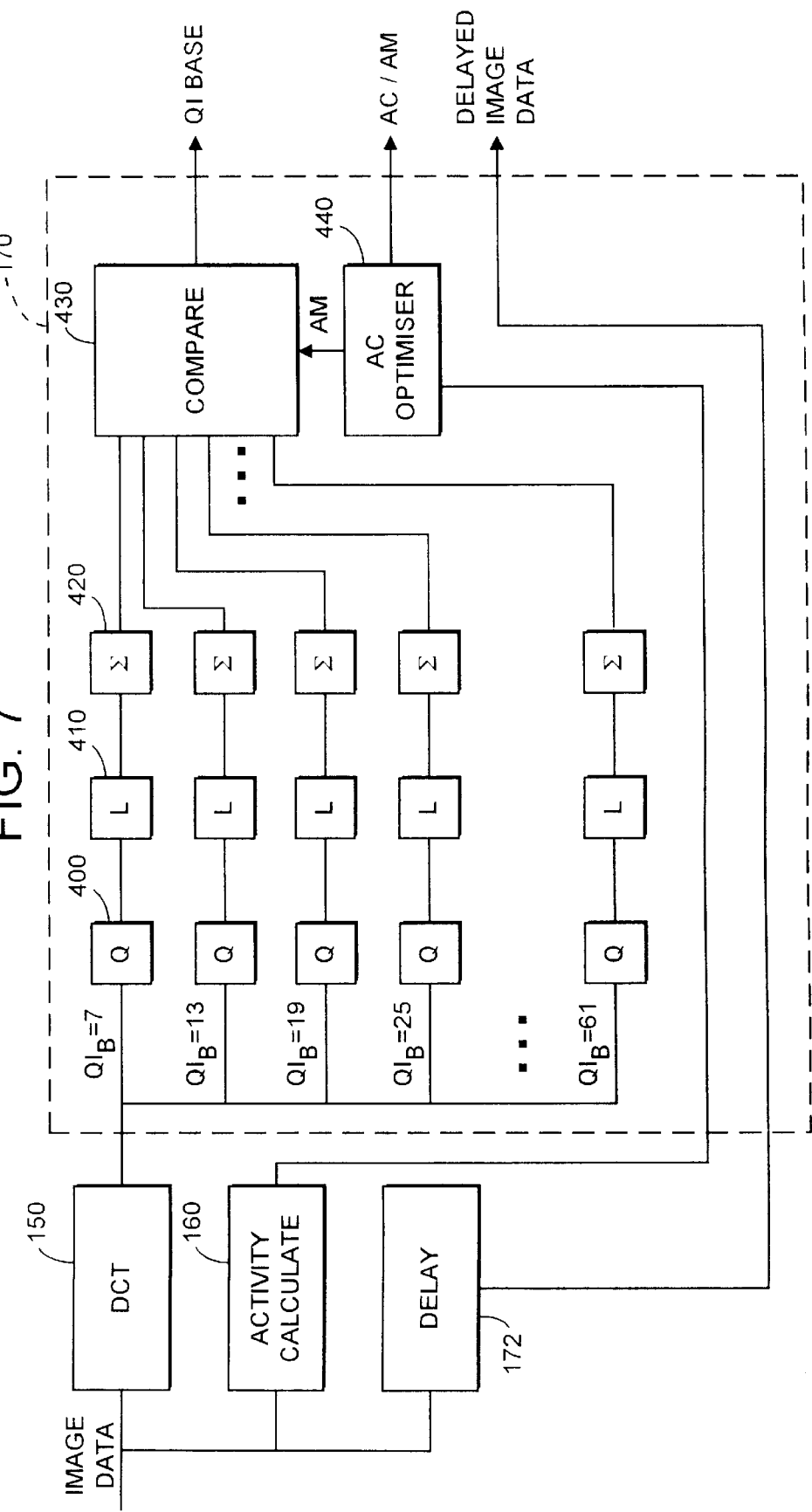
FIG. 7 schematically illustrates a bit allocator in more detail.

Referring now to FIG. 7, the operation of the bit allocator 170 will now be described in more detail.

The bit allocator 170 receives blocks of image data from the shuffler 120, DCT encoded data blocks from the DCT unit 150, and activity codes with an associated activity mode from the system controller. Activity modes and activity codes will be described in detail below with reference to FIGS. 8 and 9.

A delay unit 172 is provided (actually by the shuffler reading data later from the external shuffle RAM) for delaying the image data by the processing time of the bit allocator. Delayed image data is supplied for processing by later stages of the apparatus of FIG. 1, once the trial quantization process of the bit allocator has been completed.

Figures 12, 13:
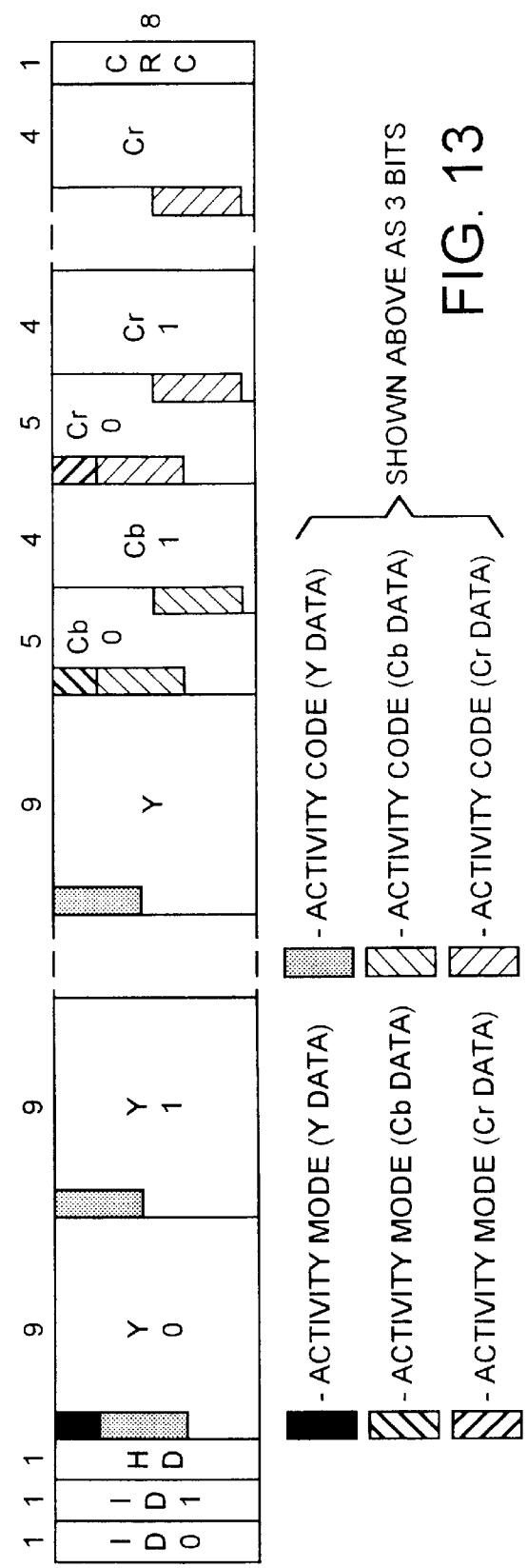
FIG. 12 schematically illustrates an optimization process.
FIG. 13 illustrates the data format of a sync block.

The DCT blocks are supplied in parallel to a number of processing chains each comprising a trial quantizer 400, a length calculator 410 and a bit summer 420. Each of the processing chains carries out a trial compression of each DCT block according to one of ten quantization "base" values: 7, 13, 19, 25, 31, 37, 43, 49, 55 and 61. The results of each trial quantization are supplied to the respective length calculator 410. This carries out a part of the processing associated with entropy encoding, in that it calculates the number of bits which would be required to entropy-encode that quantized data. These numbers of bits are summed by a summer for all of the DCT blocks within a code block. As mentioned above, a code block comprises five sync blocks, and a sync block, as illustrated in FIG. 13, is a data unit for recording onto tape, and comprises 9 luminance DCT blocks and 6 chrominance DCT blocks (3 Cb; 3 Cr).

After all of the DCT blocks of one code block have been processed in this way, the summed numbers of bits from the ten respective summers 420 are supplied to a comparator 430. This adds the amount of data needed to encode the activity codes for the DCT blocks (see below) to the outputs of the summers 420, and selects that value of the base quantization level ($QI_{base}$) which gives a quantity of coded data nearest to but under the target size of a code block. That value of $QI_{base}$ is passed to the binary search unit and the backsearch unit for further processing as described above.

In parallel with the above processing, the optimization of activity codes is being performed.

The apparatus can operate in one of four activity "modes", which determine the amount of data made available to specify the activity level of each DCT block. These activity modes are shown in FIG. 8, and vary from a mode in which no data is made available to specify the activity levels (AM=00) to one in which 3 bits per DCT block are made available (AM=11).

So, in AM=11, there are eight possible activity values which can be encoded by corresponding activity codes (AC). The effect of these activity values on the quantization level used for the corresponding DCT block is illustrated in FIG. 9. Referring to FIG. 9, it can be seen that in AM=11, the actual quantization applied to the DCT block can be modified by up to ±14 (on a scale—before modification by image activity—of about 1 to 64).

The initially selected activity mode is set by the user. The actual quantization index offsets used in the activity mode are recorded onto tape as a look-up table, so that tapes recorded using different sets of offsets can be read by the same decoding apparatus.

In AM=10, two bits are available for each AC, so up to four values can be encoded. These values are not necessarily those shown for AC=0, 1, 2 and 3 in FIG. 9, but can be any values such as ±14 and ±6. Whatever the initially selected AM, a look-up table giving the correct quantization index offsets to be used under that AM is written to tape—in fact, six times per frame.

Similarly, in AM=01, the available ACs are AC=0 and 1. In AM=00, only AC=0 is available.

The initial AM value is set by the user, and is used by the activity calculator 160 in generating activity codes to be associated with each DCT block. These codes will have 0, 1, 2 or 3 bits depending on the initially selected AM.

FIG. 10 illustrates the final quantizer 210 in more detail, and shows that the quantizer 210 receives the DCT data from the DCT unit 180, a quantization base value from the backsearch unit 200 and the quantization index offset (derived from the bitstream) for a current block. The AC and the $QI_{base}$ values are combined in a Q Index calculator 212, where the addition or subtraction specified for each AC by the table of FIG. 9 is carried out. The resulting quantization value Q is applied to the DCT data by a quantizer unit 214.

The ACs are not used in the trial quantization process carried out by the bit allocator 170. This allows the process of so-called AC optimization to be carried out in parallel to the trial quantizations.

The ACs and the AM are supplied to an AC optimizer 440. The AM may be supplied explicitly or may be implied from the length of the ACs.

The AC optimizer is illustrated in more detail in FIG. 11.

The AC and AM values are received by a maximum AC detector 442 and an AM selector 444. The maximum AC detector detects (for Y, Cb and Cr blocks separately) the maximum AC value for that sync block. This information is passed to the AM selector which detects whether the number of bits required to encode that maximum value is fewer than the number of bits allowed by the current AM, and in fact is within the allocated number of bits of a lower AM. If this is true then the AM selector replaces the initially selected AM for that sync block with a replacement, lower AM. Also, the n-bit ACs prepared under the initially selected AM are replaced with m-bit ACs, where m<n. Effectively this is done by the entropy encoder ignoring one or more most significant bits of the ACs.

In fact, although a lower order AM is specified, resulting in a saving of one or more bits per DCT block in recording the ACs, the look-up table used to decode the ACs into quantization index offsets will be the same as the look-up table for the initially selected AM. So, a two-bit AC under the initially selected AM=10 might well represent a quite different quantization index offset to the same two bit AC under an AM that has been optimized from AM=11 down to AM=10, because in the latter case the look-up table for AM=11 will still be used.

FIG. 12 is a table schematically illustrating the AC optimization process. The left-hand column of FIG. 12 lists the initial AM value. If the maximum AC value detected by the maximum AC detector 442 is one of the values shown in the centre column, then the AM for that sync block can be replaced by the "optimized" AM shown in the right-hand column, and the ACs encoded using fewer bits. Over a whole sync block, the savings made by this technique can provide a considerable extra amount of data capacity for encoding the image data itself.

FIG. 13 schematically illustrates a sync block, showing header information ("ID0", "ID1", "HD"), luminance DCT blocks (Y0, Y1 . . . ), chrominance DCT blocks (Cb0, Cb1 . . . Cr0, Cr1 . . . ) and an error checking byte ("CRC"). The AMs for Y, Cb and Cr are specified separately, at the beginning of respective Y, Cb and Cr data sections of the sync block. The ACs for each Y, Cb and Cr DCT block are then specified at the beginning of that DCT block's data.

Figure 14:
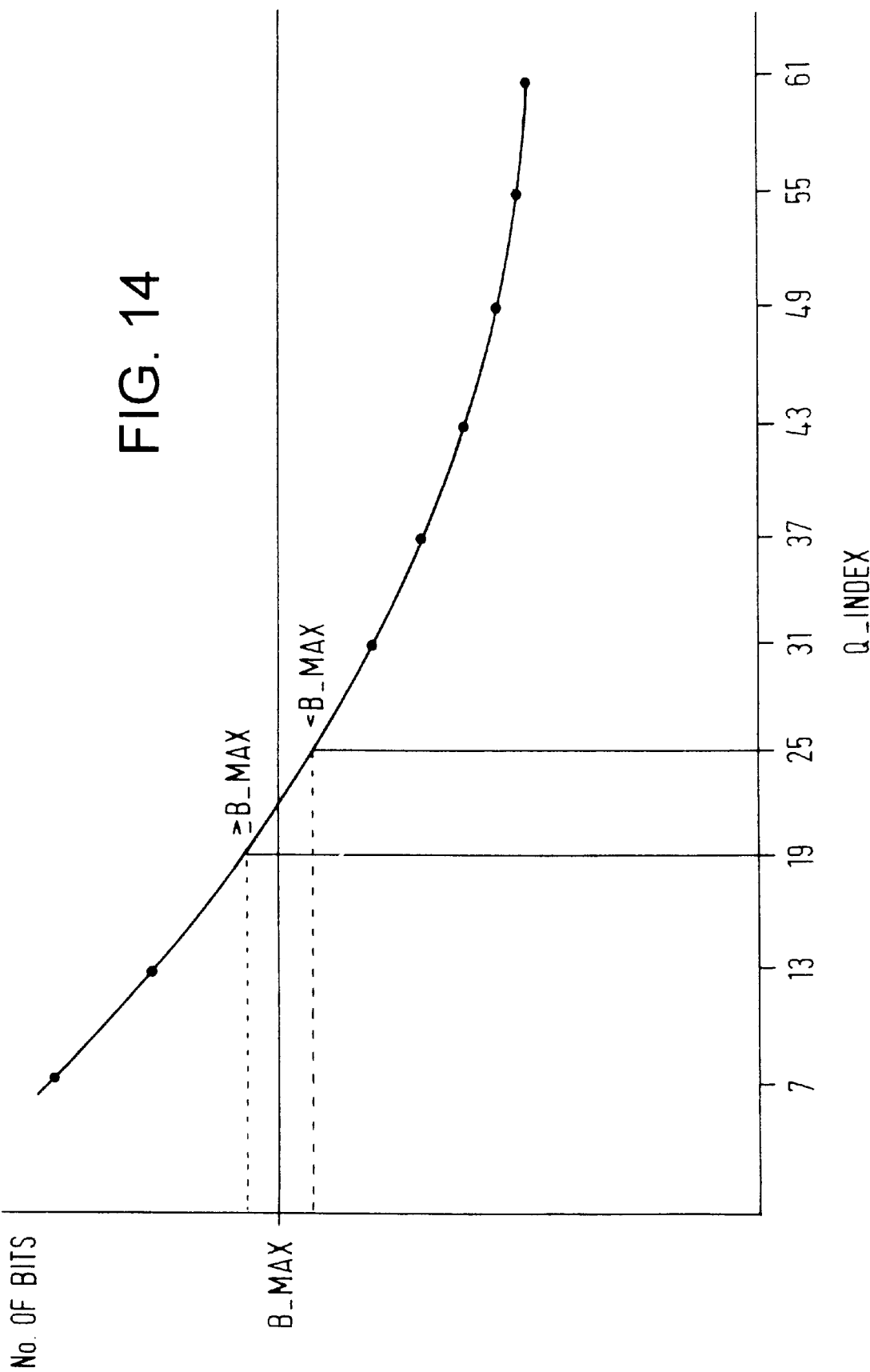
FIG. 14 schematically illustrates the operation of a bit allocator.

FIG. 14 schematically illustrates the operation of the bit allocator 170.

As described above, the bit allocator performs trial quantizations at ten specific quantizations values 7 . . . 61. FIG. 14 is a schematic graph representing the results of this trial quantization, by plotting the number of bits generated by the trial quantization process on a vertical axis against the quantization index on a horizontal axis. (It will be appreciated that the smooth curve joining the ten points of FIG. 14 is for schematic illustration only. In the bit allocator, only the ten discrete quantization values 7 . . . 61 are tested.)

A target bit rate B_max, representing the available data capacity on the tape channel 20, is applied to each code block in the data stream. The number of bits generated by the trial quantization processes of the bit allocator 170 are compared with the limit B_max. This comparison highlights two of the ten trial quantization values: one which generates a number of bits which is just greater than or equal to B_max, and the next higher test value which generates a number of bits less than B_max. A quantization base value equal to the lower of these two numbers (the one which generated the number of bits greater than or equal to B_max) plus 2 is passed to the binary search unit 190. In the example shown in FIG. 14, therefore, a base quantization value of 21 is passed to the binary search unit 190.

Figure 15:
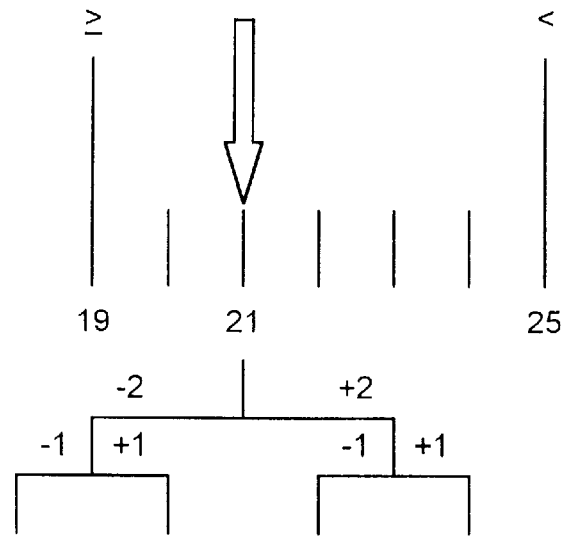
FIG. 15 schematically illustrates the operation of a binary search unit.

FIG. 15 schematically illustrates the operation of the binary search unit.

Starting from the base quantization value (e.g. 21 in this case) passed from the bit allocator, the binary search unit first detects the number of output bits which would result from using that base value.

Then, in a second stage, and depending on the result of the first stage test, the binary search unit assesses the number of bits resulting from a quantization value either 2 below the base or 2 above the base value.

In a third stage, the value tested at the second stage is either increased or decreased by 1.

Finally, the last stage of processing may also add 1 to the quantization index. these processes will be described in detail below.

Figure 16:
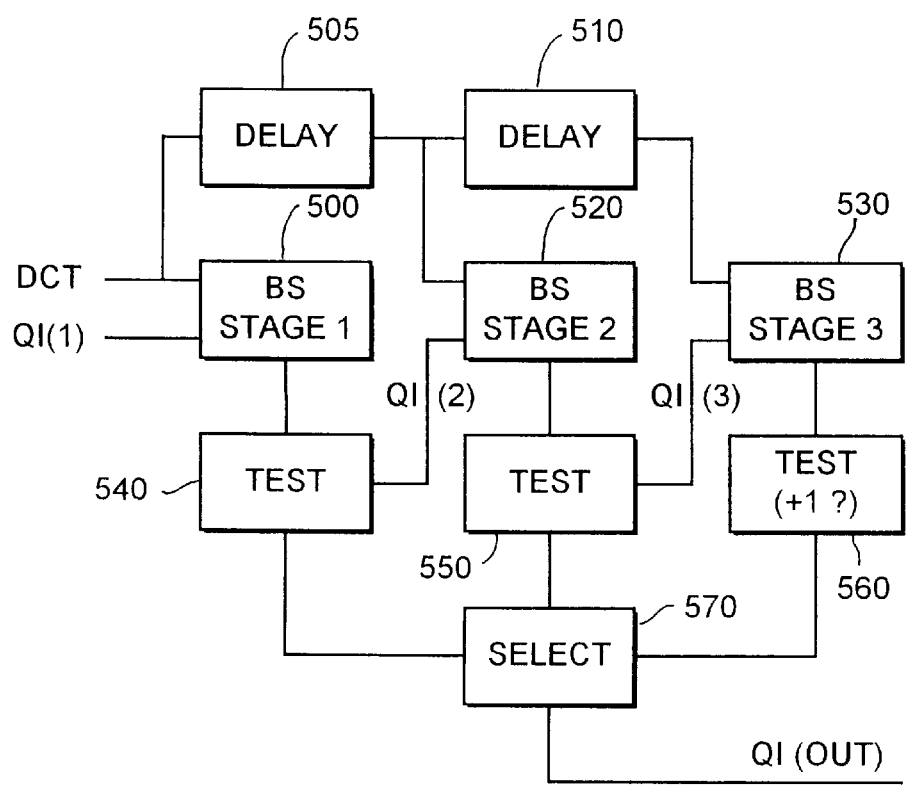
FIG. 16 is a schematic diagram of a binary search unit.

Turning to FIG. 16, DCT data from the DCT unit 180 is passed to binary search stage one 500 and to two delay units 505, 510 which supply delayed versions of the DCT data to binary search stage two 520 and binary search stage three 530.

The output of binary search stage one 500 is detected by a test unit 540 which compares the number of bits which would be generated by using the input quantization index QI(1) (in this example, 21). The test unit 540 generates a quantization index for stage two QI(2), which is either 2 greater or 2 less than QI(1). Similarly, a test unit 550 generates QI(3), which is either 1 greater or 1 less than QI(2). Finally, a test unit 560 detects whether 1 should be added to QI(3).

The test units 540, 550 and 560 supply the respective values of QI(1), QI(2) and QI(3) (potentially modified by adding 1), together with the respective bit rates generated using the quantization indices for test quantizations, to a selector 570. The selector chooses that quantization index of the possible values presented to it, which is the smallest value producing fewer bits than the bit rate target. This value is supplied as QI(out).

The actual algorithm used in the process is as follows:

| Stage 1: | use QI(1) | |
|---|---|---|
| Stage 2: | If (Bits stage 1 > target) | then QI(2) = QI(1) + 2 |
| | | else QI(2) = QI(1) − 2 |
| Stage 3: | If (Bits stage 2 > target) | then QI(3) = QI(2) + 1 |
| | | else QI(3) = QI(2) − 1 |
| Finally, | If (Bits stage 3 > target) | then QI(3) = QI(3) + 1 |
| | | else QI(3) unchanged |

QI(out) is selected as the smallest of QI(1), QI(2) and QI(3) which produces fewer than the target number of bits.

Figure 17:
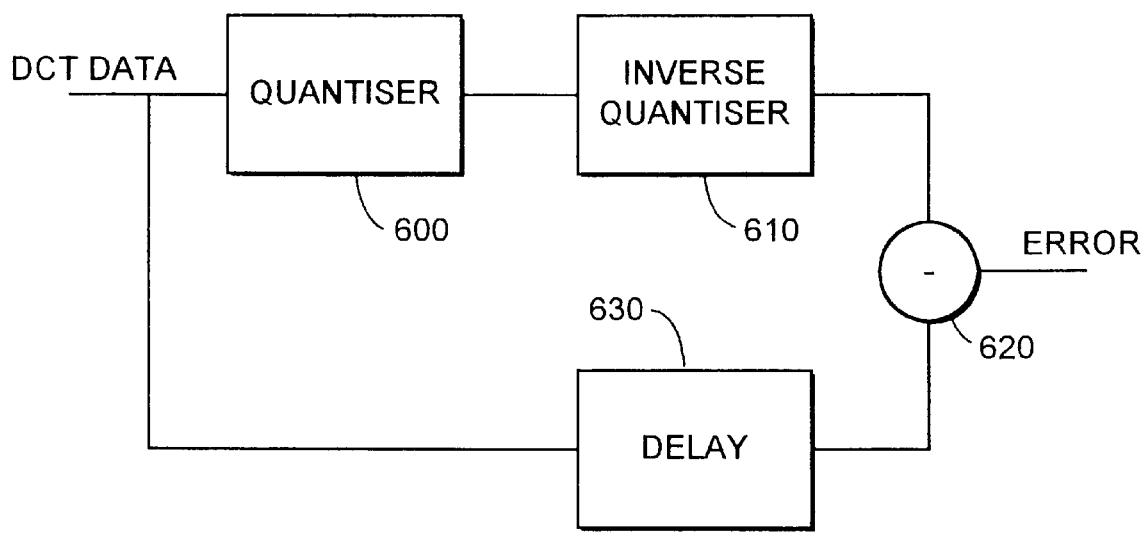
FIG. 17 schematically illustrates on element of a back-search unit.

FIG. 17 schematically illustrates an element of a backsearch unit. Backsearch is a process for testing the quantization index value chosen by the binary search. As described above, binary search generates the lowest quantization index which produces fewer bits than the bit rate target. Backsearch then tests the six adjacent higher quantization indices to detect which is the best value to be used from those six choices.

In FIG. 17, an element of the backsearch unit comprises a test quantizer 600, an inverse quantizer 610 using the same quantization index as the quantizer 600, a subtracter 620 and a delay element 630. So, the DCT data is subjected to a quantization and complementary inverse quantization process, then to be subtracted from a delayed version of the original DCT data. This produces an error signal at the output of the subtracter 620.

Figure 18:
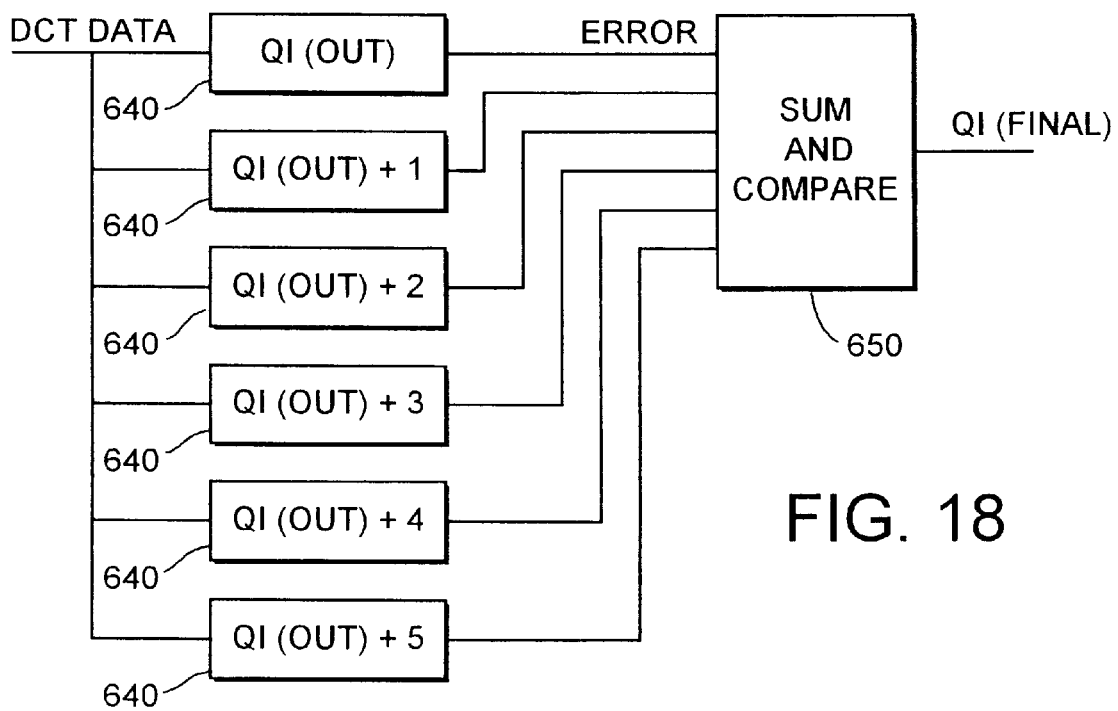
FIG. 18 is a schematic diagram of a backsearch unit.

Referring to FIG. 18, a full backsearch unit comprises six elements 640 of the type shown in FIG. 17. Each of these elements 640 operates with a different quantization index, namely:

QI(out)

QI(out)+1 . . . QI(out)+5.

The error signals produced by each of the elements 640, representing the differences between the quantized and inverse-quantized DCT data and the original DCT data, are summed over a sync block and compared by a sum and compare unit 650. The sum and compare unit 650 selects that one of the possible quantization indices tested by the six elements 640 to be used in the final quantization stage for encoding the DCT data: QI(final).

Figure 19:
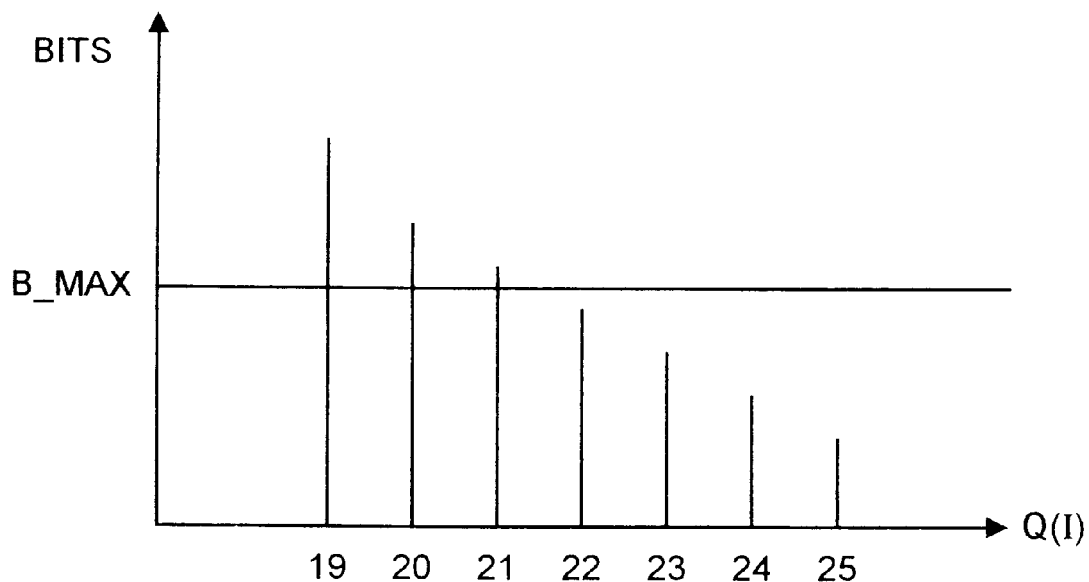
FIGS. 19 and 20 schematically illustrate the operation of the backsearch unit.
Figure 20:
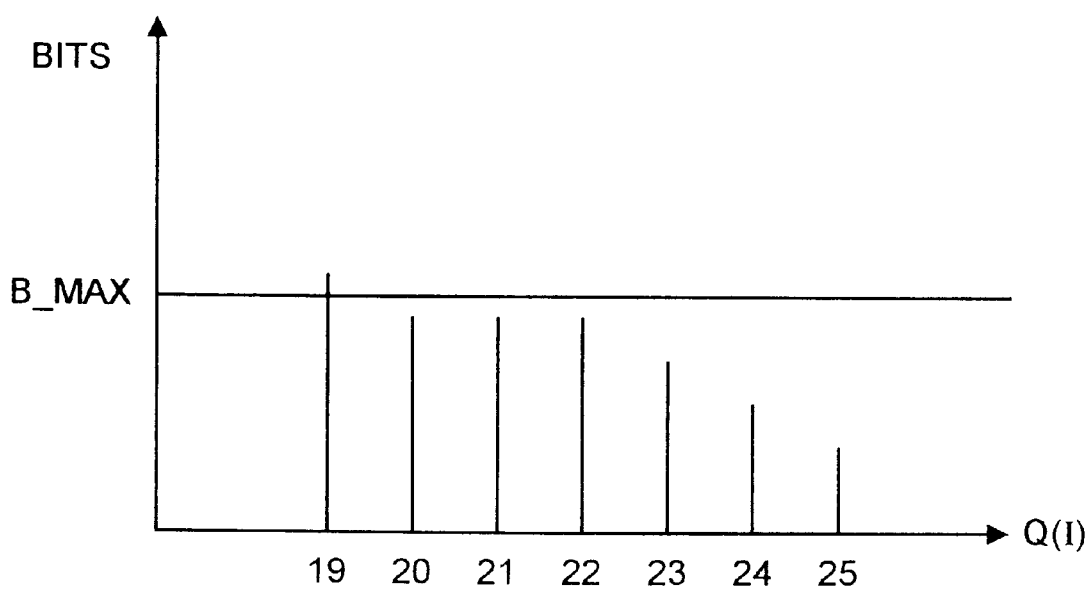

FIGS. 19 and 20 illustrate the operation of the backsearch unit. In particular, FIG. 19 illustrates a set of backsearch test results for a first generation encoded video signal, and FIG. 20 illustrates a typical set of results for the same video signal after multiple generations of encoding and decoding.

FIG. 19 illustrates one possible set of results showing the number of bits generated for quantization indices from 19 to 25. These results show that the bit rate monotonically decreases with increasing quantization index, and are typical of a first generation encoding of a real video signal. In this case, binary search would select the quantization index 22 as being the smallest number which produces fewer bits than the bit rate target, B_max. Backsearch would also confirm the choice of 22.

FIG. 20 illustrates a corresponding set of results for a video signal which has been subjected to multiple generations of encoding and decoding. These processes can cause plateaux in the relationship between number of bits produced and quantization index.

It has been noted experimentally that it is best to use the same quantization index at an earlier generation when multiple generation copies are being produced. So, for the signal of FIG. 20, it would be best to use a quantization index of 22. However, binary search would produce a quantization index of 20, being the lowest quantization index which produces a number of bits under the bit rate B_max.

When the backsearch process is applied to the results of FIG. 20, the number of errors produced is compared for the different quantization indices. Assuming that the signal of FIG. 20 is a multiple generation copy of the signal of FIG. 19, backsearch would detect that the lowest number of errors is produced by the quantization index 22.

Figure 21:
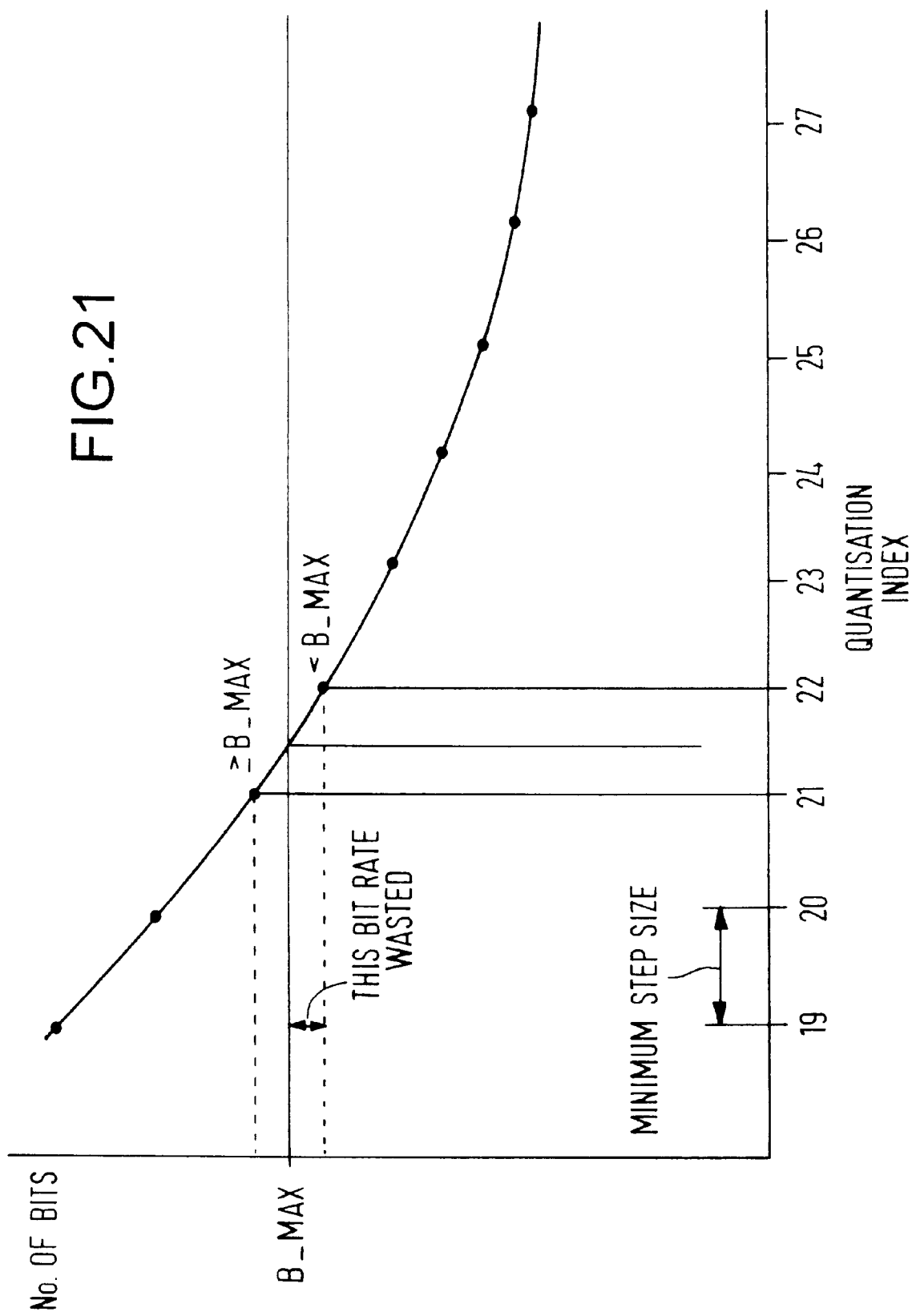
FIG. 21 schematically illustrates the way in which available bit rate can be wasted in a data compression apparatus.

FIG. 21 schematically illustrates a feature of the apparatus which could potentially lead to a waste of the available bit rate.

Because the quantization process is not a continuous variable process, there is a minimum step size (in this example, 1) between adjacent quantization index values. A value producing fewer than the required target bit rate B_max is always selected (in this example, 22) and so a proportion of the available bit rate, being the difference between B_max and the bit rate obtained using the selected quantization index, is always wasted. For real pictures, this has been determined experimentally to be between 1 and 3 percent of the available bit rate on average.

Therefore, in the present apparatus, the target bit rate is deliberately set to be between 1 and 3 percent higher than the available tape capacity. On the average, this will produce a utilization of the available bit rate which is most closer to 100 percent, thereby improving the efficiency and perceived picture quality. On odd occasions when the available bit rate is actually exceeded, measures are taken to discard excess data is a reliable and non-obvious manner for the user. These measures are taken by the data packer 230 and are described in detail below.

Figure 22:
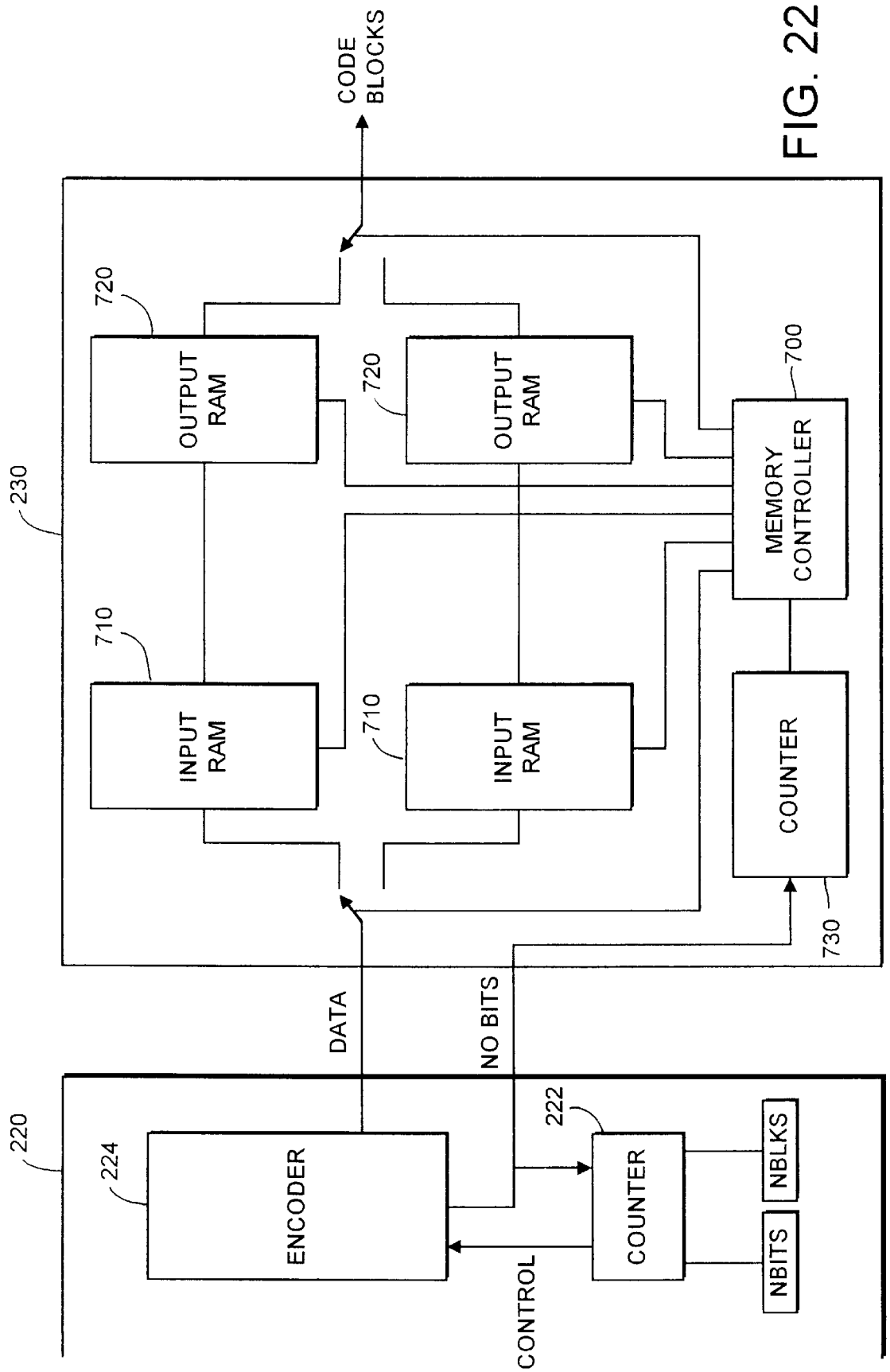
FIG. 22 schematically illustrates a data packer.

FIG. 22 schematically illustrates the operation of the entropy encoder 220 and the data packer 230.

The data packer receives data from the entropy encoder 220 comprising entropy-encoded DCT blocks and an indication of the number of bits of entropy encoded data for each DCT block.

Under the control of a memory controller 700, the data is routed to one of two input RAMs 710 to act as a swing buffer.

Each of the input RAMs 710 is 50% larger than the size of a code block. This allows any excess data (up to 150% of the target size of the code block) to be received by the input RAM 710. The packing of the data into the output RAMs 720, described below with reference to FIGS. 25 to 28, deals with discarding any excess data from the input RAMs. However, in case a current code block gives rise to more than 150% of the target data quantity (i.e. more than the capacity of the data formatter's input RAM) farther measures are needed to truncate data blocks. These measures will be described below.

While data is being loaded into one of the input RAMs 710, data already stored (from a previous code block) in the other input RAM 710 is packed into an output RAM 720. Again, while data is being packed into one of the output RAMs 720, under the control of the memory controller 700 data is read out of the other of the output RAMs 720 to form the output code blocks.

The number of bits for each of the data blocks, and the number of blocks received so far, are detected by a counter 730, the count form which is used by the memory controller 700.

In the entropy encoder 220, a further counter 222 stores a cumulative total number of bits (nbits) and a cumulative total number of blocks (nblks). The counter 222 compares these counts with the (predetermined) size of the input RAM 710, as described below, and controls the operation of the actual encoder unit 224 of the entropy encoder.

Figure 23:
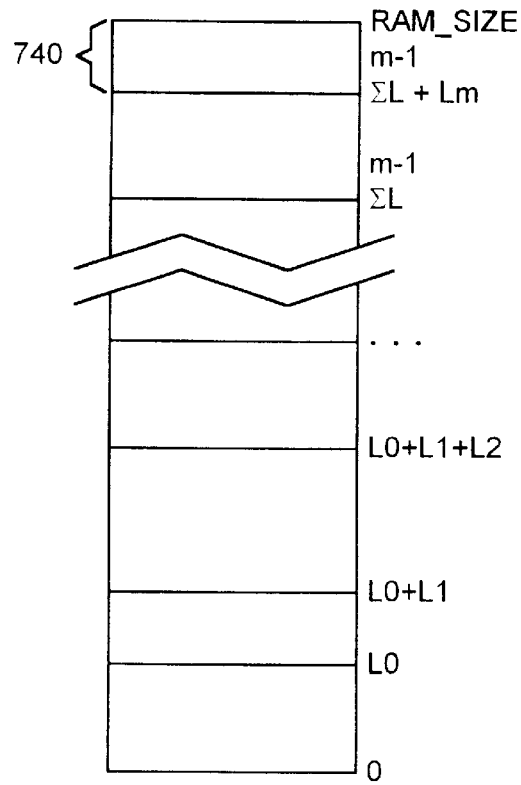
FIG. 23 schematically illustrates data stored in a RAM of the data packer.

FIG. 23 schematically illustrates the way in which received data is stored in one of the input RAMs 710.

When a first block is received, it is stored from addresses 0 to L0, where L0 is the length of that block. The second block (of length L1) is stored between addresses L0 and (L0+L1). This process continues, with the "mth" block being stored between addresses $$\sum_{1}^{m-1} L \quad \text{and} \quad \sum_{1}^{m-1} L + L_m$$

As each block is generated by the entropy encoder, the counter 222 detects whether there is sufficient space left in the input RAM 710 to store the remaining DCT blocks of the current code block. If it is determined that there is insufficient space (and this determination will be described below in more detail), then the counter 222 issues a control signal to the entropy encoder to truncate the remaining DCT data blocks and only the truncated versions stored in the input RAM 710.

Figure 24A:
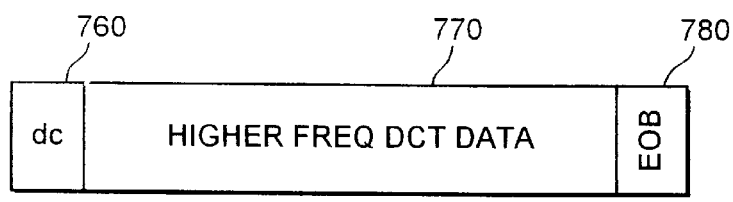
FIGS. 24a to 24c schematically illustrate encoded DCT blocks.
Figure 24B:
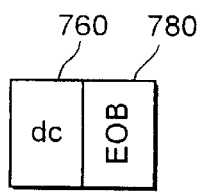
Figure 24C:
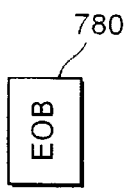
Figure 25:
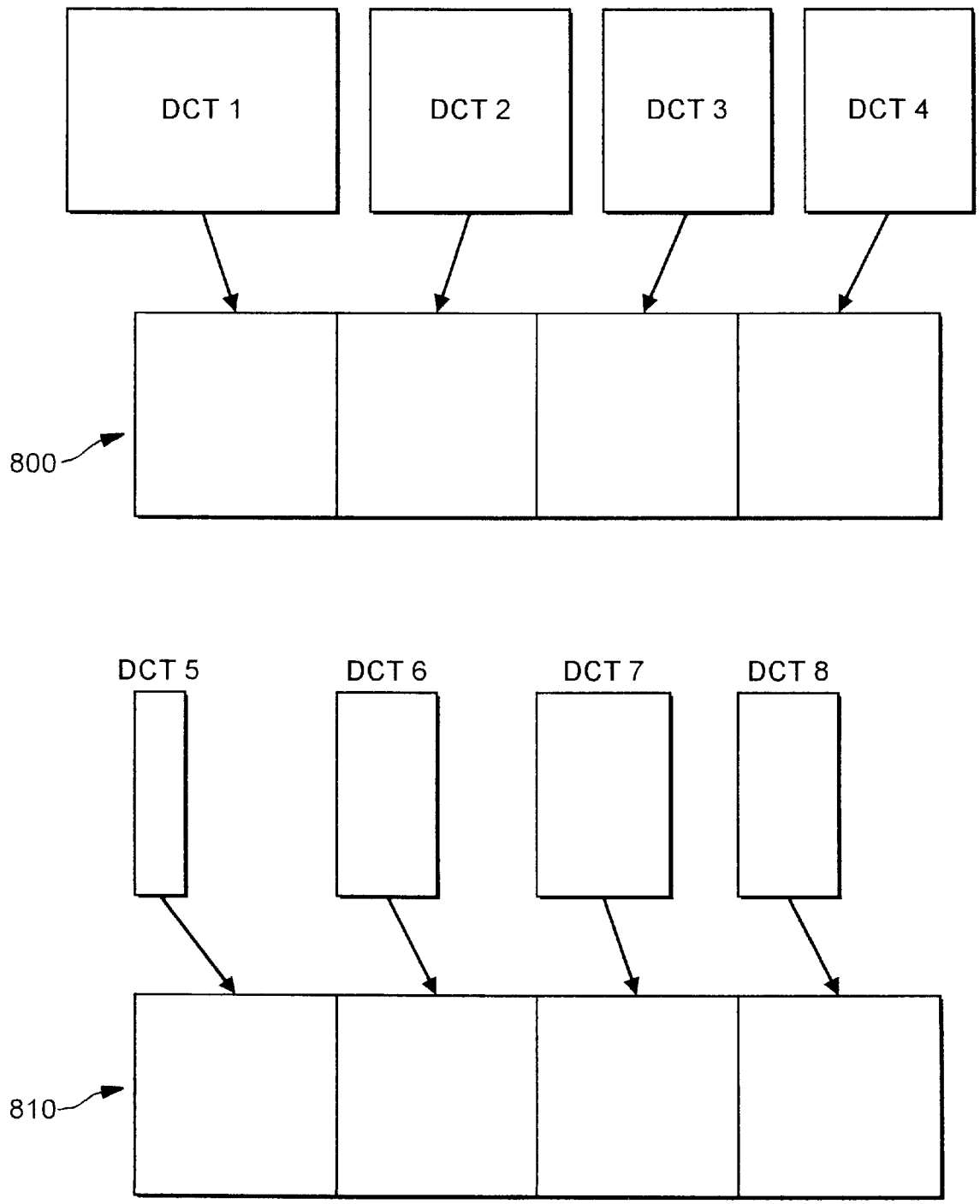
FIGS. 25 to 28 schematically illustrate the packing of data into a code block for recording onto tape.

FIGS. 24a to 24c schematically illustrate the truncation process applied to encoded DCT blocks.

FIG. 24a illustrates a non-truncated DCT block comprising a value indicative of the DC level of the block 760, higher spatial frequency DCT data 770 and an end-of-block (EOB) flag 780. The EOB flag is in fact optional; if the encoder produces exactly the correct amount of data to be decoded into a complete DCT block, then the EOB flag is not needed. However, where the encoder detects or determines that the remainder of a block should be padded with zeroes, the EOB flag provides a short code to signify this state. Clearly, EOB flags are needed in truncated data blocks—see below.

For luminance DCT blocks, the truncated version of this block which is used is shown in FIG. 24b, and comprises just the DC value 760, and end-of-block flag 780.

For chrominance blocks (FIG. 24c), the truncated version is even shorter, comprising only the end-of-block flag 780.

So, since the length of the DC value (for luminance blocks) and the end-of-block flags in each DCT block are known, the following algorithm can be used by the counter 222 to detect whether subsequent blocks need to be truncated in order to fit into the input RAM 710:

In other words, if the remaining RAM space after a current DCT block n is $$\left( \text{RAM size} - \sum^{n} L \right) < (\text{No of } DCT \text{ blocks} - n) * (\text{truncated block size})$$

added will not sufficient even for the remaining DCT blocks to be added even if they were all truncated, then the current DCT block and those following must be truncated.

The entropy encoder achieves the truncation by simply not encoding the parts of the data to be omitted. An EOB flag is inserted instead, forcing the decoder to pad the DCT block with zero-valued data.

In an alternative embodiment, a predetermined "block error" flag can be inserted by the entropy encoder in place of the truncated data block. Such a flag would force the decoder to treat that data block as erroneous, so forcing data concealment to be used.

FIGS. 25 to 28 schematically illustrate the packing of data from the output RAM 720 into a code block for recording on tape. This technique ensures that each DCT block is allocated at least an equal share of the available data capacity of the code block. Any space which is not needed out of these equal shares is re-allocated amongst other DCT blocks. DCT data is also packed in order of increasing spatial frequency, so that if any data has to be discarded as part of the packing process it would tend to be the higher frequency data; missing high frequency data tends to be less subjectively noticeable than missing low frequency data.

For schematic explanation only, the code block is considered to consist of two sync blocks 800, 810, each being arranged to store four DCT blocks. DCT blocks DCT1 to DCT4 correspond to the first sync block and blocks DCT5 to DCT8 correspond to the second sync block.

Each sync block is initially subdivided into four equal storage areas.

Figure 26:
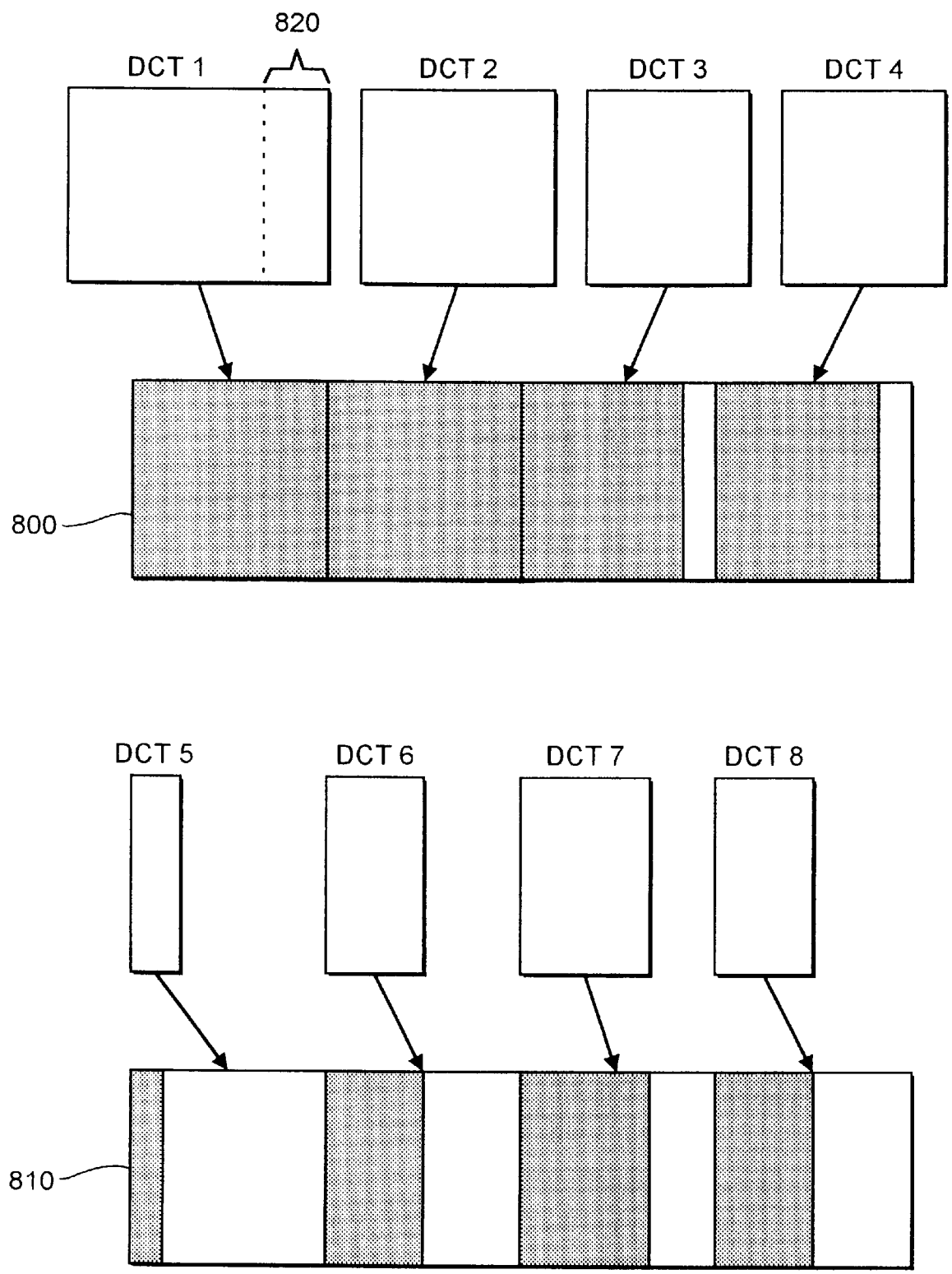
Figure 27:
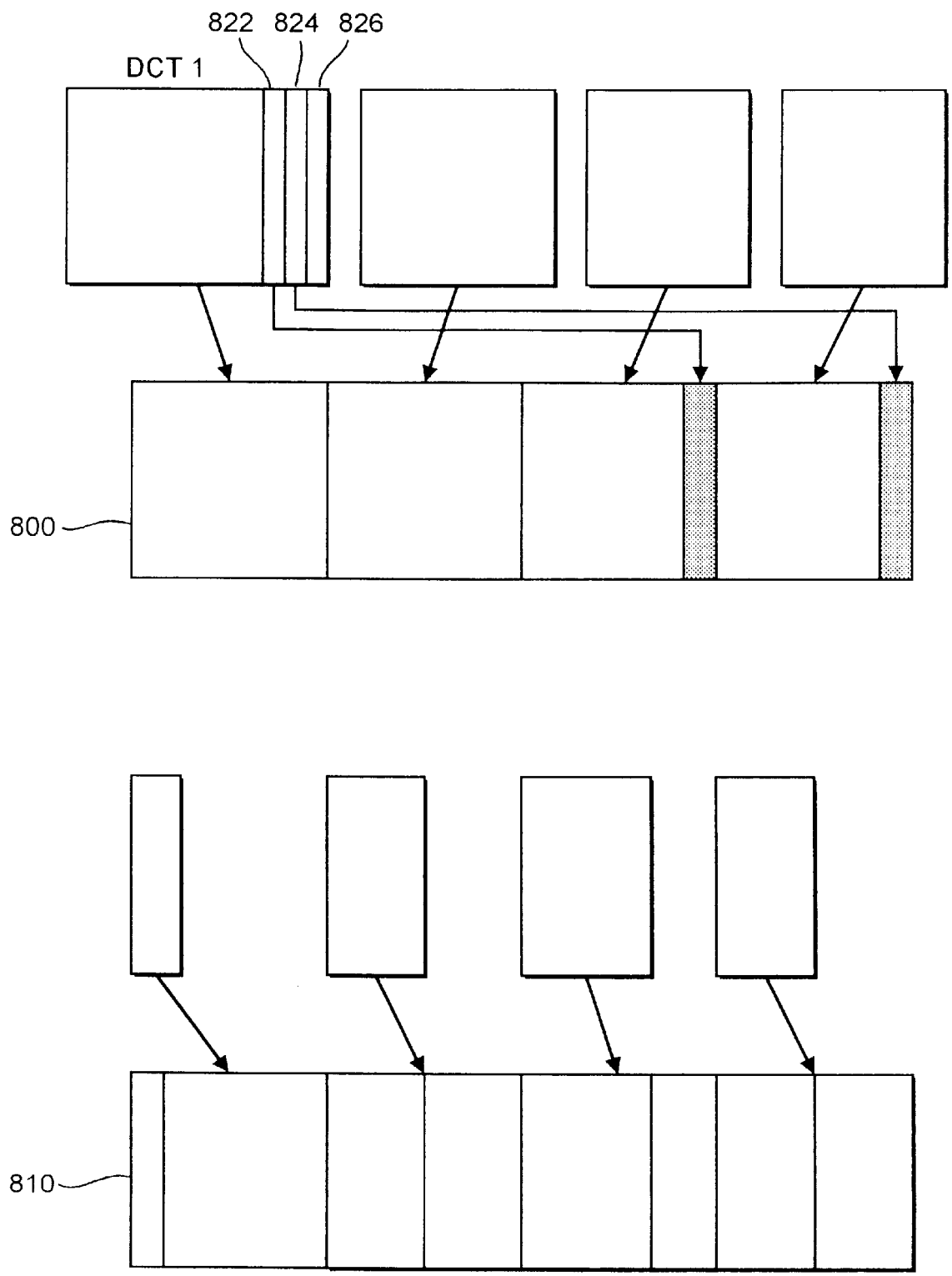

Referring to FIG. 26, a first pass is made to put as much as possible of each DCT block into the corresponding subdivision of the sync blocks 800, 810. In the case of block DCT1, not all of the block can be fitted into the subdivision, and a certain amount 820 of the block has yet to be packed.

Block DCT2 exactly fills the corresponding subdivision of the sync block 800. Blocks DCT3 and DCT4 can fit into the corresponding subdivisions, leaving further available space for other data to be stored.

Similarly, blocks DCT5 to DCT8 all fit into their respective subdivisions leaving further available space.

Figure 28:
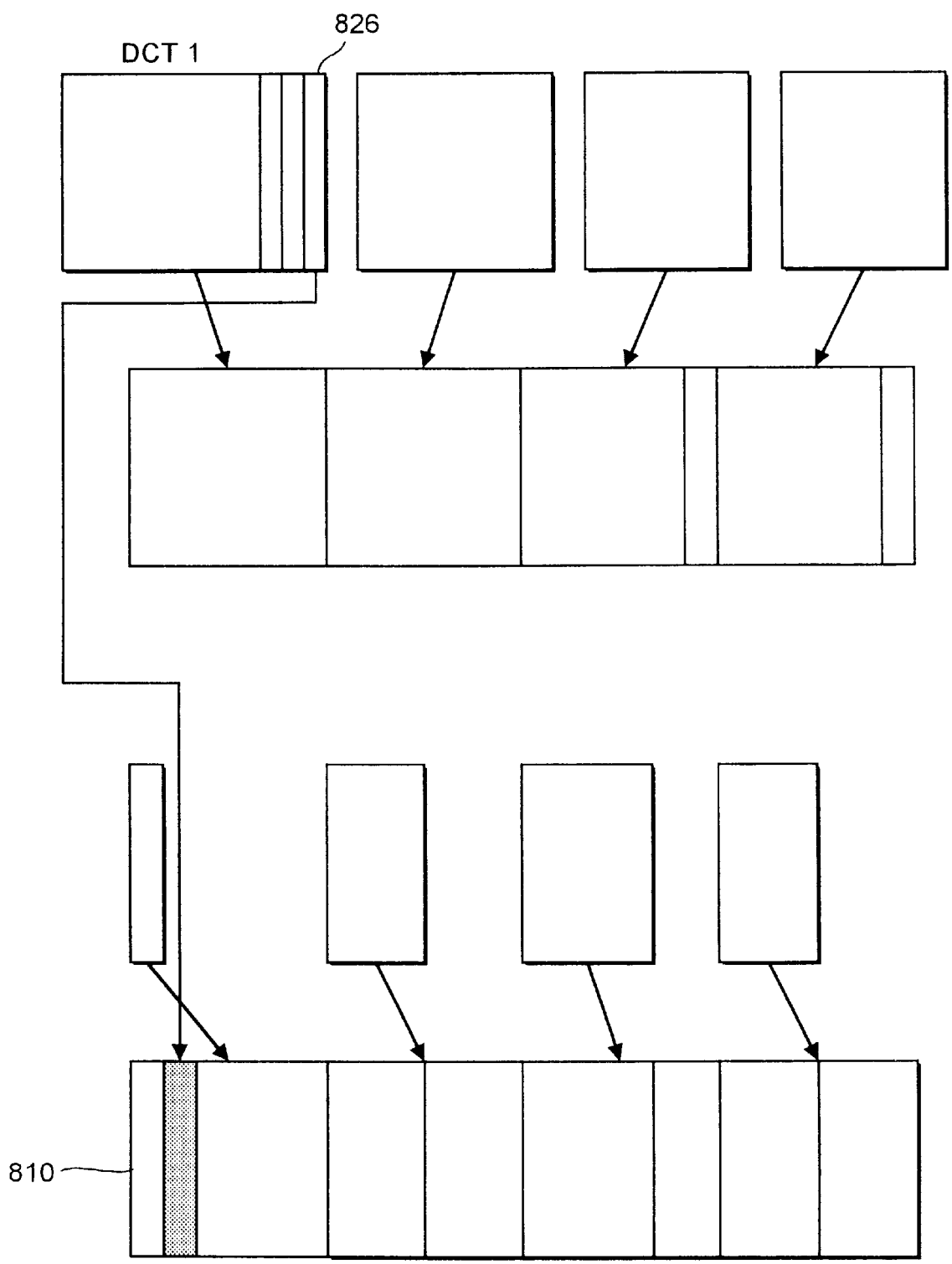

FIG. 28 illustrates the way in which the excess data from block DCT1 is packed into some of the remaining available space in the sync blocks 800, 810.

In a second pass, therefore, portions 822 and 824 of the DCT block DCT1 may be fitted into the available space within the sync block 800 (the sync block corresponding to block DCT1). However, this still leaves a further portion 826 of the block DCT1 which will not fit into that sync block 800.

So, in FIG. 28, in a third pass of the packing operation, the remaining portion 826 of the block DCT1 is fitted into remaining space in the sync block 810.

Therefore, in summary, a three-pass operation is performed to fit data from each DCT block firstly, where possible, into the corresponding subdivision of that sync block; secondly, where possible, into remaining available space within the same sync block; and thirdly, into available remaining space within other sync blocks.

The sync blocks are then concatenated to form the output code block.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Image data compression apparatus in which data is encoded using a variable degree of quantization selected for areas of an image so that a quantity of encoded data for each area does not exceed a predetermined maximum quantity of data, said apparatus comprising:

two or more trial encoders operable in parallel to trial encode image data using respective predetermined trial degrees of quantization;

a selector for selecting one of said predetermined trial degrees of quantization in response to said quantities of encoded data produced during said trial quantizations; and one or more further trial encoders operable to trial encode the image data using degrees of quantization derived from said degree of quantization selected by said selector.

2. Apparatus according to claim 1, in which said predetermined degrees of quantization are substantially evenly spaced through a range of available degrees of quantization.

3. Apparatus according to claim 1, in which said one or more further trial encoders comprise at least two further trial encoder stages in an iterative arrangement so that a degree of quantization used by a second and subsequent trial encoder stages is derived from a degree of quantization used by a preceding trial encoder stage and a quantity of data generated by said preceding trial encoder stage.

4. Apparatus according to claim 1, comprising:

a data quantizer; and a comparator for comparing said quantities of data generated by each of said further trial encoders, and for selecting a degree of quantization to be used by said data quantizer.

5. A method of image data compression in which data is encoded using a variable degree of quantization selected for areas of an image so that said quantity of encoded data for each area does not exceed a predetermined maximum quantity of data, said method comprising the steps of:

operating two or more trial encoders in parallel to trial encode image data using respective predetermined trial degrees of quantization;

selecting one of said predetermined trial degrees of quantization in response to said quantities of encoded data produced during said trial quantizations; and trial encoding the image data using degrees of quantization derived from said degree of quantization selected by said selector.

* * * * *